United States Patent
Kirihara et al.

(10) Patent No.: US 11,915,334 B2
(45) Date of Patent: Feb. 27, 2024

(54) INFORMATION PROCESSING DEVICE AND INFORMATION PROCESSING METHOD FOR PREDICTING PRESENCE OR ABSENCE OF USER AT VISIT DESTINATION FROM SENSED DATA

(71) Applicants: SONY CORPORATION, Tokyo (JP); SONY MOBILE COMMUNICATIONS INC., Tokyo (JP)

(72) Inventors: Reiko Kirihara, Tokyo (JP); Norihiro Takahashi, Tokyo (JP); Saki Yokoyama, Tokyo (JP); Satoshi Hosokawa, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 540 days.

(21) Appl. No.: 16/641,380

(22) PCT Filed: Jul. 3, 2018

(86) PCT No.: PCT/JP2018/025134
§ 371 (c)(1),
(2) Date: Feb. 24, 2020

(87) PCT Pub. No.: WO2019/049492
PCT Pub. Date: Mar. 14, 2019

(65) Prior Publication Data
US 2020/0193546 A1    Jun. 18, 2020

(30) Foreign Application Priority Data
Sep. 7, 2017    (JP) .................. 2017-171780

(51) Int. Cl.
*G10L 15/22* (2006.01)
*G06Q 50/28* (2012.01)
(Continued)

(52) U.S. Cl.
CPC ............. *G06Q 50/28* (2013.01); *G01C 21/34* (2013.01); *G08B 21/02* (2013.01); *G08B 21/22* (2013.01);
(Continued)

(58) Field of Classification Search
CPC ......... G10L 21/00; G10L 15/22; G06Q 10/04; G06Q 10/08; G06Q 10/083;
(Continued)

(56) References Cited

U.S. PATENT DOCUMENTS 5,831,860 A * 11/1998 Foladare ................ G06Q 10/08
700/242
8,015,023 B1 * 9/2011 Lee ........................ G06Q 10/08
705/7.15
(Continued)

FOREIGN PATENT DOCUMENTS

CN          106557831 A      4/2017
EP          3016049 A1 *     5/2016    ............. G06Q 10/10
(Continued)

OTHER PUBLICATIONS

Extended European Search Report of EP Application No. 18854631.1 dated Oct. 7, 2020 11 pages.
(Continued)

*Primary Examiner* — Martin Lerner
(74) *Attorney, Agent, or Firm* — CHIP LAW GROUP

(57) ABSTRACT

Provided is an information processing device including a presence/absence prediction unit that performs prediction of presence/absence of a user at a visit destination on a basis of
(Continued)

| USER | RELATIONSHIP | GEN-DER | AGE | DEFINITION OF PRESENT STATE | | DEFINITION OF ABSENCE STATE | | EXCLUSION TARGET |
|---|---|---|---|---|---|---|---|---|
| | | | | ABOUT ACTION OR STATE | ABOUT TIME | ABOUT ACTION OR STATE | ABOUT TIME | |
| U1 | HUSBAND (HOUSEHOLDER) | MALE | 40 | WITHIN 300 m FROM HOME (D1) | AFTER 10:00 A.M. (D5) | DURING SLEEP DURING BATHING DURING WORK (D3) | AFTER 9:00 P.M. (D7) | — |
| U2 | WIFE | FEMALE | 39 | WHEN PACKAGE DELIVERY LOCKER IS RESERVED (D2) | AFTER 9:00 A.M. (USER'S HOME) BEFORE 9:00 P.M. (PACKAGE DELIVERY LOCKER) (D6) | DURING SLEEP DURING BATHING (D4) | AFTER 9:00 P.M. (D8) | — |
| U3 | CHILD | MALE | 9 | — | — | — | — | ◯ (D9) |
| U4 | CHILD | FEMALE | 5 | — | — | — | — | ◯ (D10) | sensed data, and a providing unit that provides a result of the prediction to an external device.

14 Claims, 20 Drawing Sheets

(51) Int. Cl.
  *G01C 21/34* (2006.01)
  *G08B 21/02* (2006.01)
  *G08B 21/22* (2006.01)
  *G10L 15/00* (2013.01)
(52) U.S. Cl.
  CPC ............ *G10L 15/00* (2013.01); *G10L 15/005* (2013.01); *G10L 15/22* (2013.01); *G10L 15/222* (2013.01); *G10L 2015/223* (2013.01)
(58) Field of Classification Search
  CPC ......... G06Q 10/08355; G06Q 10/0838; G06Q 10/063116; G01C 21/3484
  USPC ............ 704/270, 270.1; 705/7.15, 7.18, 337, 705/341, 7.16; 701/425
  See application file for complete search history.

(56) References Cited

U.S. PATENT DOCUMENTS

| | | | | |
|---|---|---|---|---|
| 8,160,972 | B1* | 4/2012 | Tannenbaum | G06Q 10/0835 705/336 |
| 8,473,326 | B1* | 6/2013 | Griffith | G06Q 10/083 705/7.13 |
| 8,538,965 | B1* | 9/2013 | Talyansky | G06F 16/168 707/738 |
| 11,182,730 | B2* | 11/2021 | Sager | G06Q 10/0833 |
| 2002/0147619 | A1* | 10/2002 | Floss | G06Q 30/02 705/5 |
| 2008/0046326 | A1* | 2/2008 | Horstemeyer | G06Q 10/0833 705/14.69 |
| 2009/0048890 | A1 | 2/2009 | Burgh | |
| 2011/0060425 | A1* | 3/2011 | Freed | G06N 5/04 700/33 |
| 2014/0180959 | A1* | 6/2014 | Gillen | G06Q 10/08355 705/341 |
| 2016/0260135 | A1 | 9/2016 | Zomet et al. | |
| 2016/0267547 | A1 | 9/2016 | Umeno et al. | |
| 2016/0292568 | A1* | 10/2016 | Schaul | G06N 20/00 |
| 2016/0321604 | A1 | 11/2016 | Imaeda et al. | |
| 2016/0335865 | A1* | 11/2016 | Sayavong | G06F 16/245 |
| 2017/0092102 | A1 | 3/2017 | Fusakawa et al. | |
| 2017/0109709 | A1* | 4/2017 | Wu | G06Q 10/1095 |
| 2017/0147929 | A1 | 5/2017 | Tsunoda et al. | |
| 2017/0328725 | A1* | 11/2017 | Schlesinger | G01C 21/3484 |
| 2020/0193338 | A1* | 6/2020 | Kirihara | G06Q 10/063116 |

FOREIGN PATENT DOCUMENTS

| | | |
|---|---|---|
| JP | 2000089665 A | 3/2000 |
| JP | 2002160814 A | 6/2002 |
| JP | 2007279971 A | 10/2007 |
| JP | 2009157890 A | 7/2009 |
| JP | 2015087957 A | 5/2015 |
| JP | 2017037562 A | 2/2017 |
| JP | 6298079 B2 | 3/2018 |
| JP | 6625022 B2 | 12/2019 |
| WO | 2015064230 A1 | 5/2015 |
| WO | 2015/092860 A1 | 6/2015 |
| WO | 2015/182200 A1 | 12/2015 |

OTHER PUBLICATIONS

International Search Report and Written Opinion in PCT/JP2018/025134 dated Oct. 9, 2018, (9 Pages).

* cited by examiner

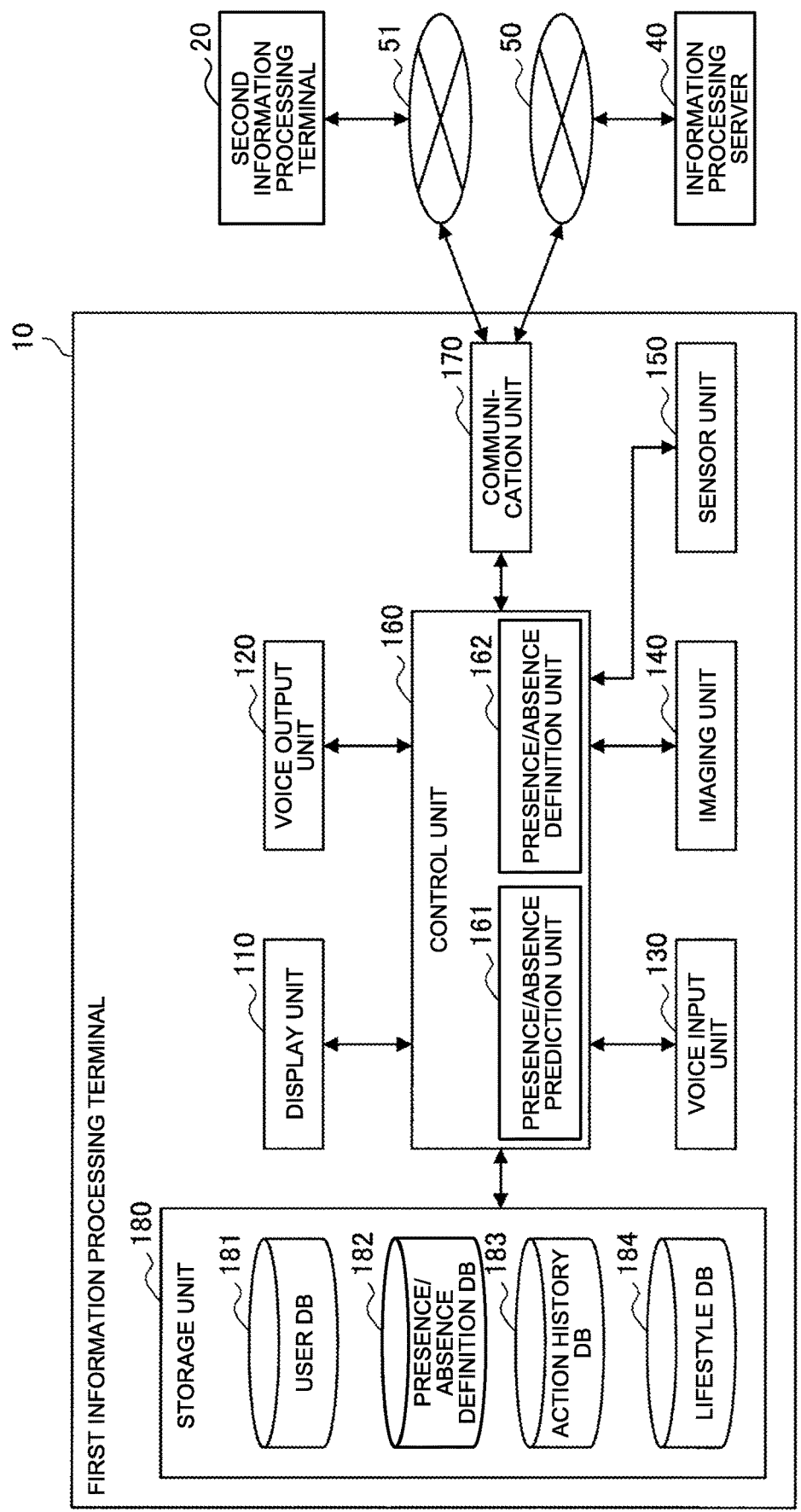

FIG.7

| USER | RELATIONSHIP | GENDER | AGE | DEFINITION OF PRESENT STATE | | DEFINITION OF ABSENCE STATE | | EXCLUSION TARGET |
|---|---|---|---|---|---|---|---|---|
| | | | | ABOUT ACTION OR STATE | ABOUT TIME | ABOUT ACTION OR STATE | ABOUT TIME | |
| U1 | HUSBAND (HOUSE-HOLDER) | MALE | 40 | WITHIN 300 m FROM HOME ⎬D1 | AFTER 10:00 A.M. ⎬D5 | DURING SLEEP DURING BATHING DURING WORK ⎬D3 | AFTER 9:00 P.M. ⎬D7 | — |
| U2 | WIFE | FEMALE | 39 | WHEN PACKAGE DELIVERY LOCKER IS RESERVED ⎬D2 | AFTER 9:00A.M. (USER'S HOME) BEFORE 9:00 P.M. (PACKAGE DELIVERY LOCKER) ⎬D6 | DURING SLEEP DURING BATHING ⎬D4 | AFTER 9:00 P.M. ⎬D8 | — |
| U3 | CHILD | MALE | 9 | — | — | — | — | ○~D9 |
| U4 | CHILD | FEMALE | 5 | — | — | — | — | ○~D10 |

INFORMATION PROCESSING DEVICE AND INFORMATION PROCESSING METHOD FOR PREDICTING PRESENCE OR ABSENCE OF USER AT VISIT DESTINATION FROM SENSED DATA

CROSS REFERENCE TO RELATED APPLICATIONS

This application is a U.S. National Phase of International Patent Application No. PCT/JP2018/025134 filed on Jul. 3, 2018, which claims priority benefit of Japanese Patent Application No. JP 2017-171780 filed in the Japan Patent Office on Sep. 7, 2017. Each of the above-referenced applications is hereby incorporated herein by reference in its entirety.

FIELD

The present disclosure relates to an information processing device and an information processing method.

BACKGROUND

A recent increase in demand for visit services including home delivery services and the like has brought about development of various technologies for improving the efficiency or quality of visit services.

For example, the following Patent Literature 1 discloses a technology for improving security by suppressing reference to presence information by a delivery person, when the receiver has alternative means (e.g., package delivery locker or the like) available, in a home delivery service. Furthermore, Patent Literature 2 discloses a technology by which a receiver can, for example, notify a delivery person of information about absence for a short time within a time period where delivery is scheduled, in a home delivery service.

CITATION LIST

Patent Literature

Patent Literature 1: JP 2009-157890 A
Patent Literature 2: JP 2017-37562 A

SUMMARY

Technical Problem

However, in the visit service, it is sometimes difficult to accurately notify a visitor of presence/absence information about a user at a visit destination. For example, in the technology of Patent Literature 2, after the receiver notifies the delivery person of the absence time specified by the receiver in advance, if the absence time is changed, it is impossible to cope with the change of the absence time.

Therefore, the present disclosure proposes a new and improved information processing device and information processing method that are configured to more accurately notify a visitor of presence/absence information about a user at a visit destination.

Solution to Problem

According to the present disclosure, an information processing device is provided that includes: a presence/absence prediction unit that performs prediction of presence/absence of a user at a visit destination on a basis of sensed data; and a providing unit that provides a result of the prediction to an external device.

Moreover, according to the present disclosure, an information processing device is provided that includes: an acquisition unit that acquires prediction information about presence/absence of users at a plurality of visit destinations from an external device; and a visit-destination-to-be-assigned determination unit that determines visit destinations to be assigned to a visitor, on a basis of the prediction information.

Moreover, according to the present disclosure, an information processing device is provided that includes: an acquisition unit that acquires, from an external device, information about visit destinations assigned to a visitor, the information being determined on a basis of prediction information about presence/absence of users at a plurality of visit destinations; and a display unit that displays the information about visit destinations assigned to a visitor.

Moreover, according to the present disclosure, an information processing method is provided that includes the steps of: predicting presence/absence of a user at a visit destination, on a basis of sensed data; and providing a result of the prediction to an external device, wherein the steps are executed by a processor.

Moreover, according to the present disclosure, an information processing method is provided that includes the steps of: obtaining prediction information about presence/absence of users at a plurality of visit destinations from an external device; and determining visit destinations to be assigned to a visitor, on a basis of the prediction information, wherein the steps are executed by a processor.

Moreover, according to the present disclosure, an information processing method is provided that includes the steps of: acquiring, from an external device, information about visit destinations assigned to a visitor, the information being determined on a basis of prediction information about presence/absence of users at a plurality of visit destinations; and displaying the information about visit destinations assigned to a visitor, wherein the steps are executed by a processor.

Advantageous Effects of Invention

As described above, according to the present disclosure, it is possible to more accurately notify a visitor of presence/absence information about a user at a visit destination.

Note that the above effects are not necessarily limitative, and any of the effects described herein or other effects perceived from the present description may be exhibited, along with or instead of the above effects.

BRIEF DESCRIPTION OF DRAWINGS

FIG. 6 is a block diagram illustrating an exemplary functional configuration of a first information processing terminal 10.

FIG. 7 is a diagram illustrating an example of information about a definition of presence/absence.

DESCRIPTION OF EMBODIMENTS

Figure 1:
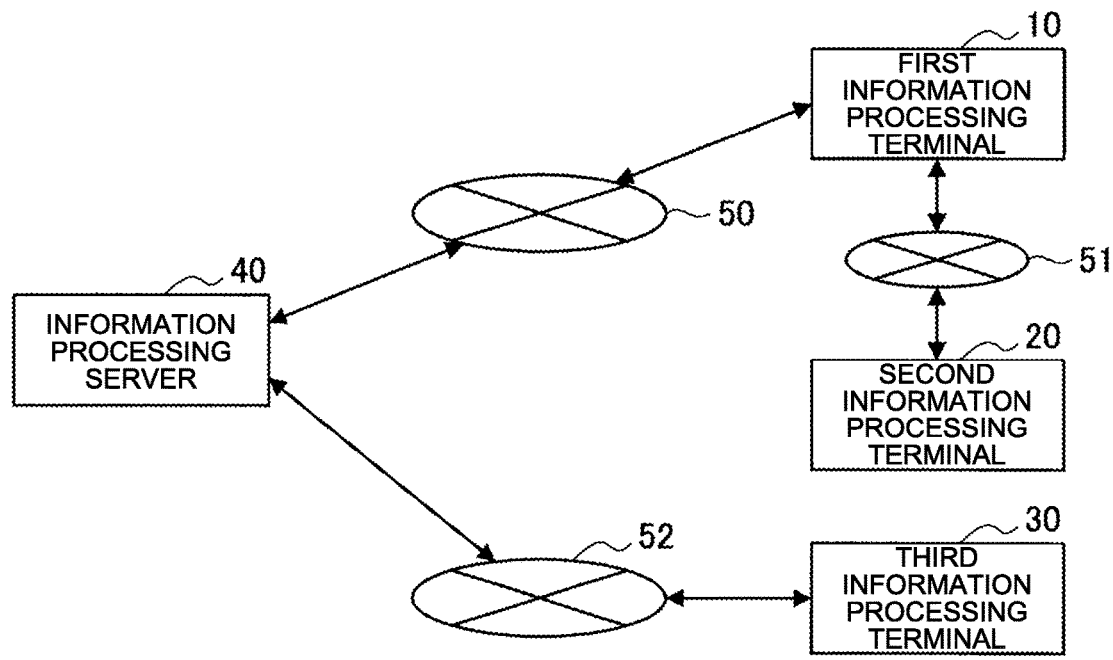
FIG. 1 is a diagram illustrating an exemplary configuration of an information processing system according to an embodiment of the present disclosure.

Preferred embodiments of the present disclosure will be described in detail below with reference to the accompanying drawings. Note that, in this description and drawings, components having substantially the same functional structures are denoted by the same reference numerals, and redundant description thereof will be omitted.

Note that a description will be made in the following order.

1. Embodiment
 1.1. Background
 1.2. Exemplary system configuration
 1.3. Functional overview
 1.4. Exemplary functional configuration of first information processing terminal 10
 1.5. Exemplary functional configuration of second information processing terminal 20
 1.6. Exemplary functional configuration of information processing server 40
 1.7. Exemplary functional configuration of third information processing terminal 30
 1.8. Procedures of processes
 1.9. Example of display by third information processing terminal 30
 1.10. Various services to which present disclosure is applied
2. Exemplary hardware configuration
3. Summary 1. Embodiment <<1.1. Background>>

In recent years, demand for home delivery services has increased along with the spread of mail-order sales, Internet shopping, or the like. In addition, along with the diversification of service forms, demand for various visit services (e.g., home childcare services, housekeeping services, sitter services, etc.) also has increased. Here, in previous visit services including home delivery services, users have been allowed to specify a time period convenient to receive a service on the basis of their future presence/absence predicted.

However, with this method, it may be difficult to accurately notify a visitor of presence/absence information about a user at a visit destination. For example, if the situation suddenly changes after the specification and the user at the visit destination cannot receive the service in the specified time period, the cost for providing the service may increase due to the failure in visit.

The above-problems cannot be solved even by the technologies of Patent Literature 1 and Patent Literature 2 described above. For example, in the technology of Patent Literature 2, after the user at a delivery destination notifies a delivery person of the absence time specified by the user in advance, if the absence time is changed, it is impossible to cope with the change of the absence time.

The technical idea according to the present disclosure has been conceived in view of the above descriptions and enables more accurate notification of presence/absence information about a user at a visit destination to be given to a visitor.

Note that a visit service to which the present disclosure is applied is not particularly limited. For example, the visit service to which the present disclosure is applied includes various services that require visitors to visit appropriate places (e.g., appropriate facilities, such as a house or a company, appropriate points, etc.) for appropriate purposes.

<<1.2 Exemplary System Configuration>>

The background of the present disclosure has been described above. Next, an exemplary configuration of an information processing system according to the present embodiment will be described with reference to FIG. 1.

As illustrated in FIG. 1, the information processing system according to the present embodiment includes a first information processing terminal 10, a second information processing terminal 20, a third information processing terminal 30, and an information processing server 40. In addition, the first information processing terminal 10 and the information processing server 40 are connected to each other via a network 50, the first information processing terminal 10 and the second information processing terminal 20 are connected to each other via a network 51, and the third information processing terminal 30 and the information processing server 40 are connected to each other via a network 52.

(First Information Processing Terminal 10)

The first information processing terminal 10 according to the present embodiment is an information processing device for a visit service, arranged on the premises of a visit destination and is an agent device that makes voice conversation with a user. More specifically, the first information processing terminal 10 includes a voice input mechanism and a voice output mechanism, and is configured to analyze the user's voice to understand the contents of the speech and speak so as to correspond to the contents of the speech. Note that the type of the first information processing terminal 10 is not particularly limited. For example, the first information processing terminal 10 may be either a fixed terminal or a mobile terminal (e.g., including an autonomous mobile terminal or the like) as long as the first information processing terminal 10 is arranged on the premises of the visit destination. Furthermore, the first information processing terminal 10 may be a mobile phone, smartphone, tablet, wearable device, general-purpose computer, or the like as long as the first information processing terminal 10 is arranged on the premises of the visit destination.

The first information processing terminal 10 includes various sensors in the first information processing terminal 10 and is configured to acquire sensed data from these sensors. The first information processing terminal 10 is also configured to acquire sensed data from an external device (e.g., a second information processing terminal 20, which is described later, or a device arranged on or off the premises of the visit destination). Note that the sensed data acquired by the first information processing terminal 10 are not particularly limited. For example, the sensed data acquired by the first information processing terminal 10 includes data output by any sensor, such as an acceleration sensor, gyro sensor, image sensor (e.g., charge-coupled device (CCD) sensor or complementary metal oxide semiconductor (CMOS) sensor), geomagnetic sensor, atmospheric pressure sensor, temperature sensor, vibration sensor, voice sensor, heart rate sensor, pulse wave sensor, proximity sensor, illuminance sensor, pressure sensor, position sensor (e.g. global navigation satellite system (GNSS)) sensor or the like), perspiration sensor, pH sensor, humidity sensor, or infrared sensor.

Furthermore, the first information processing terminal 10 has a function of predicting the presence/absence of the user at the visit destination on the basis of sensed data and providing prediction information about the presence/absence as a prediction result to the information processing server 40. Hereinafter, a state in which the user can cope with a visit or desires a visit is referred to as "presence state", and a state in which the user cannot cope with a visit or does not desire a visit is referred to as "absence state". In other words, the "presence state" does not simply represent presence of the user at a visit destination and the "absence state" does not simply represent absence of the user at the visit destination. If it is impossible for the user being located at the visit destination to have the visit, such a situation represents the "absence state", and if it is possible for the user not being located at the visit destination to have the visit, such a situation represents the "presence state". In addition, when there is a plurality of users at a visit destination (e.g., in a case where the visit destination is a house and a family exists in the house, etc.), the "presence state" or "absence state" may be provided for each visit destination, in addition to the presence/absence of each user. It is assumed that the prediction information about the presence/absence, which is provided to the information processing server 40 by the first information processing terminal 10, includes at least one of information about the "presence state" and information about the "absence state". Details of a process relating to the presence/absence will be described later.

Furthermore, the first information processing terminal 10 has a function of setting a definition of the presence/absence of a user, on the basis of an input from the user. Details of a process of setting the definition of presence/absence will be described later.

(Second Information Processing Terminal 20)

The second information processing terminal 20 according to the present embodiment is an information processing device carried by a user at a visit destination in a visit service or an information processing device mounted on the user. In other words, the second information processing terminal 20 is an information processing device whose position changes with the user. In addition, the second information processing terminal 20 may be an agent device that makes voice conversation with the user as in the first information processing terminal 10. Note that the type of the second information processing terminal 20 is not particularly limited. For example, the second information processing terminal 20 may be the same type of device as the first information processing terminal 10.

The second information processing terminal 20 includes various sensors in the second information processing terminal 20 and is configured to acquire sensed data from these sensors and provide the sensed data to the first information processing terminal 10. Note that the sensed data acquired by the second information processing terminal 20 are not particularly limited. For example, the sensed data acquired by the second information processing terminal 20 may be the same as the sensed data that can be acquired by the first information processing terminal 10.

(Information Processing Server 40)

The information processing server 40 according to the present embodiment is an information processing device configured to manage prediction information about the presence/absence of each user at a visit destination in a visit service. More specifically, the information processing server 40 acquires the prediction information about the presence/absence of a user at each visit destination from the first information processing terminal 10 via the network 50 and manages the information.

Furthermore, the information processing server 40 has a function of determining a visit destination to be assigned for each visitor from a plurality of visit destinations, on the basis of the prediction information about the presence/absence. Details of a process of determining a visit destination to be assigned for each visitor will be described later.

Furthermore, the information processing server 40 has a function of determining a visit route for visiting all assigned visit destinations in a time period in which each user at each assigned visit destination can cope with a visit, on the basis of the prediction information about the presence/absence. Details of a process of determining the visit route will be described later.

Then, the information processing server 40 provides information about assigned visit destinations and a visit route for each visitor to the third information processing terminal 30 carried by each visitor.

Note that the type of the information processing server 40 is not particularly limited. For example, the information processing server 40 may be a device of the same type as that of the first information processing terminal 10.

(Third Information Processing Terminal 30)

The third information processing terminal 30 according to the present embodiment is a device carried by a visitor in a visit service. The third information processing terminal 30 has a mechanism acquiring information about assigned visit destinations for each visitor and a visit route from the information processing server 40 and displaying the information. The third information processing terminal 30 includes a position sensor (e.g., a GNSS sensor or the like) and is configured to identify the position of the third information processing terminal 30 (i.e., the position of the visitor). This makes it possible that the third information processing terminal 30 causes map information to be displayed and causes the assigned visit destinations, the visit route, the position of the third information processing terminal 30, a time period of the "presence state" and time period of the "absence state" at an assigned visit destination, and the like to be displayed on the map information in a superimposed manner. Then, the visitor can visit each assigned visit destination while confirming the display by the third information processing terminal 30. Note that detailed contents of the display by the third information processing terminal 30 will be described later.

Furthermore, the type of the third information processing terminal 30 is not particularly limited. For example, the third information processing terminal 30 may be a device of the same type as that of the first information processing terminal 10.

(Network 50, Network 51, and Network 52)

The network 50, the network 51, and the network 52 may include a public line network, such as the Internet, a telephone line network, satellite communication network, various local area networks (LAN) including Ethernet (registered trademark), a wide area network (WAN), and the like. Furthermore, the network 50, network 51, and network 52 may include a dedicated line such as Internet protocol-virtual private network (IP-VPN). The network 50, the network 51, and the network 52 may include a wireless communication network such as Wi-Fi (registered trademark) or Bluetooth (registered trademark).

The exemplary configuration of the information processing system according to the present embodiment has been described above. The configuration described above with reference to FIG. 1 is merely an example, and the configuration of the information processing system according to the present embodiment is not limited to such an example. For example, the functions of the first information processing terminal 10 and second information processing terminal 20 may be achieved by a single device or the functions of the first information processing terminal 10, the second information processing terminal 20, and the information processing server 40 may be achieved by a single device. The configuration of the information processing system according to the present embodiment is flexibly changeable in shape according to the specification or operation thereof.

<<1.3. Functional Overview>>

The exemplary configuration of the information processing system according to the present embodiment has been described above. Next, an overview of the functions of devices according to the present embodiment will be described.

(Functional Overview of First Information Processing Terminal 10)

As described above, the first information processing terminal 10 acquires sensed data from various sensors provided in the first information processing terminal 10 and an external device (e.g., the second information processing terminal 20, a device arranged on or off the premises of a visit destination, or the like). Then, the first information processing terminal 10 is configured to predict the presence/absence of the user at the visit destination, using the sensed data.

For example, the first information processing terminal 10 is configured to determine the presence/absence of a person on and off the premises of the visit destination, using various sensors (e.g., an infrared sensor, a voice sensor, an image sensor, or the like) of the first information processing terminal 10 or of the external device installed at the visit destination. In particular, the first information processing terminal 10 is configured to recognize not only the presence/absence of a person but also a person by analyzing sensed data from an audio sensor and an image sensor. In addition, the first information processing terminal 10 is configured to identify the position or the like of the user by analyzing sensed data from various sensors (e.g., position sensors and the like) of the second information processing terminal 20 or sensed data acquired from an external device (e.g., an image sensor or the like installed on a road) installed at any position.

Then, the first information processing terminal 10 estimates the user's action by analyzing these sensed data. More specifically, the first information processing terminal 10 compares data of a past action history of the user with the sensed data to estimate a user's action. For example, the first information processing terminal 10 may calculate a sensed data-action relevance score that is an index value indicating a relevance between sensed data and a certain action to estimate an action corresponding to the highest score as the user's action. The type of the sensed data used for the process of estimating the user's action is not particularly limited. For example, when a sensor is provided in a home key, shoes, or the like, the first information processing terminal 10 may acquire sensed data about opening/closing by the home key or sensed data about putting on/taking off the shoes and analyze the sensed data, and the user's entrance and exit to and from his/her house may be estimated.

Then, the first information processing terminal 10 predicts the user's action at a certain time point in the future, on the basis of a result of the estimation of the action. More specifically, the first information processing terminal 10 applies a result of the estimation of the user's action to lifestyle data of the user that is generated on the basis of the data of a past action history of the user and predicts a user's action at a certain time point in the future. For example, the first information processing terminal 10 may calculate an action-lifestyle relevance score, which is an index value indicating a relevance of a certain action (or a plurality of actions performed on that day) with a lifestyle, and predict the user's action at a certain point in the future on the basis of a lifestyle corresponding to the highest score.

This makes it possible that the first information processing terminal 10 predicts the presence/absence of the user at the visit destination on the basis of a result of the prediction of the user's action. More specifically, the first information processing terminal 10 is configured to predict a time period in which the visit destination is in the presence state (or absence state).

Note that the method of predicting the presence/absence of the user is not limited to the method described above. For example, the first information processing terminal 10 may predict the presence/absence of the user by cooperating with a predetermined application in addition to the sensed data. For example, the first information processing terminal 10 may cooperate with an application managing a schedule of the user to use the information of the schedule of the user for a process of predicting the presence/absence of the user. For example, when schedule information "gym" is registered, the first information processing terminal 10 may recognize a lifestyle of the user on the day on which the user goes to the gym on the basis of the lifestyle data to predict the presence/absence of the user at a certain point in the future.

In addition, when it is difficult to determine either the "presence state" or the "absence state", the first information processing terminal 10 may output "need to confirm" or the like that is neither the "presence state" nor the "absence state". Furthermore, the first information processing terminal 10 may output a likelihood of the "presence state" or "absence state".

Furthermore, as described above, the first information processing terminal 10 is configured to set a definition of the presence/absence of a user on the basis of an input from the user. For example, the user is configured to set the definition of the presence/absence by voice conversation with the first information processing terminal 10 or the second information processing terminal 20.

Figure 2:
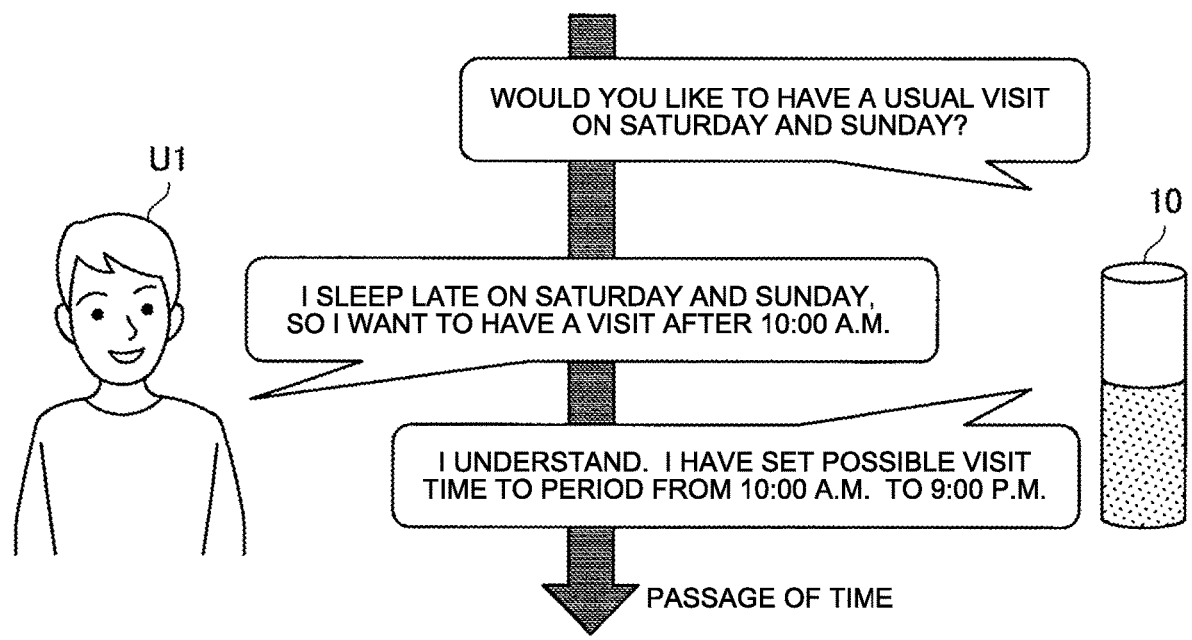
FIG. 2 is a diagram illustrating an example of setting a definition of presence/absence by voice conversation.

Here, an example of setting a definition of the presence/absence by voice conversation will be described with reference to FIGS. 2 to 5. FIG. 2 illustrates an example of setting a definition of presence/absence for a general visit. For example, as illustrated in FIG. 2, the first information processing terminal 10 says "Would you like to have a usual visit on Saturday and Sunday?" On the other hand, a user U1 says, "I sleep late on Saturday and Sunday, so I want to have a visit after 10:00 A.M." Thus, the first information processing terminal 10 understands the contents of the speech by analyzing the voice uttered by the user U1 and sets 10:00 A.M. on Saturday and Sunday as the start time of the "presence state" of the user U1. Note that the first information processing terminal 10 may also set the end time or the like of the "presence state" that the user U1 does not speak, on the basis of default settings, the contents of a visit service (e.g., a time period in which the service is provided etc.), the lifestyle of the user U1, or the like. For example, the first information processing terminal 10 may set 9:00 P.M., which is the average bedtime of the user U1, as the end time of the "presence state". Then, the first information processing terminal 10 says "I understand. I have set possible visit time to a period from 10:00 A.M. to 9:00 P.M.", notifying the user U1 of the contents of setting.

As described above, by using the voice conversation, the user is configured to more easily set the definition of the presence/absence. In addition, when the user cannot substantially cope with a visit or the time is bad for the user, even during a time period in which the user is at the visit destination, the user can avoid the visit. Note that a method of setting the definition of presence/absence may employ any method that uses no voice conversation.

Figure 3:
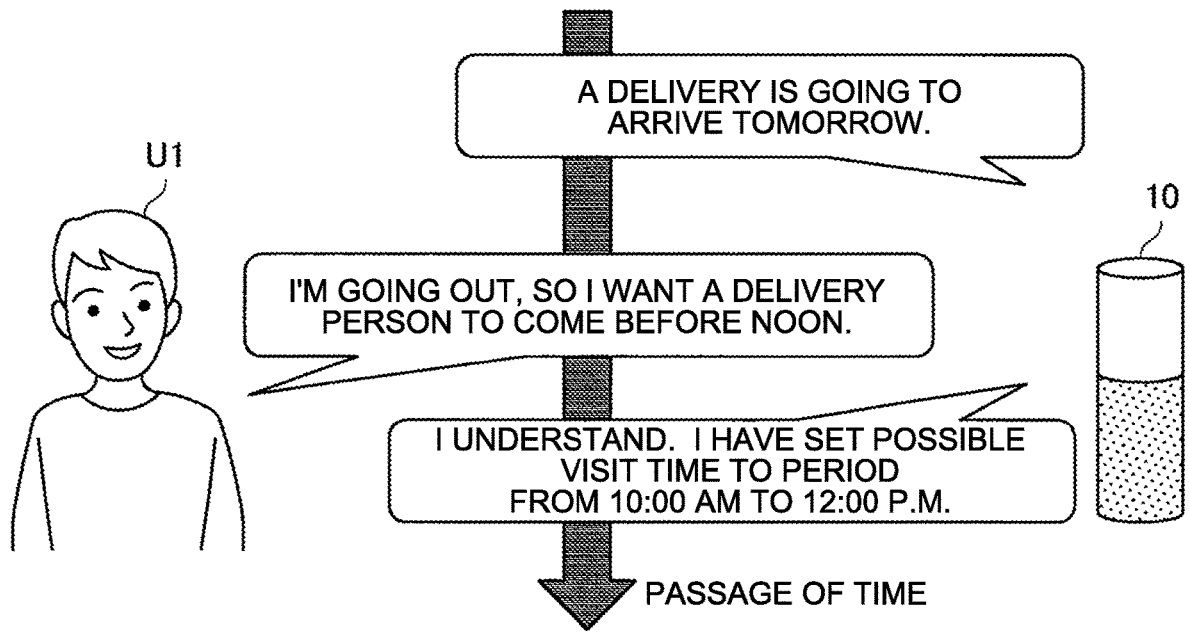
FIG. 3 is a diagram illustrating an example of setting a definition of presence/absence by voice conversation.

FIG. 3 illustrates an example of setting a definition of presence/absence for a specific visit. The definition of presence/absence for a specific visit, which is set in FIG. 3, may further take precedence over the setting of the definition of presence/absence for the general visit, which is set in FIG. 2. As illustrated in FIG. 3, the first information processing terminal 10 confirms whether there is a delivery for the next day with a predetermined system (e.g., home delivery system etc.) and says "A delivery is going to arrive tomorrow." to the user U1. On the other hand, the user U1 says "I'm going out, so I want a delivery person to come before noon." The first information processing terminal 10 understands the contents of the speech by analyzing the voice uttered by the user U1 and sets noon on the next day as the end time of the "presence state" for the visit. In addition, as in the above description, the first information processing terminal 10 may also set the start time of the "presence state" that the user U1 does not speak, on the basis of default settings, the contents of a visit service (e.g., a time period in which the service is provided etc.), the lifestyle of the user U1, or the like. For example, the first information processing terminal 10 may set 10:00 A.M. that is the start time of a time period in which a service of the visit service is provided, as the start time of the "presence state". Then, the first information processing terminal 10 says "I understand. I have set possible visit time to a period from 10:00 A.M. to 12:00 P.M.", notifying the user U1 of the contents of setting.

Figure 4:
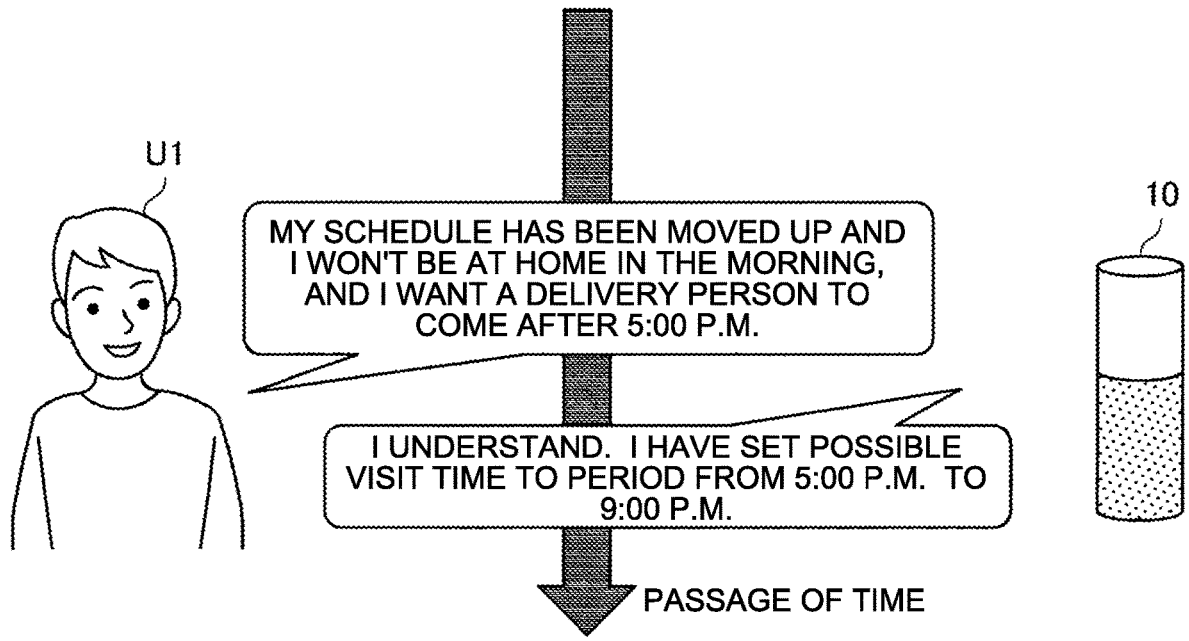
FIG. 4 is a diagram illustrating an example of setting a definition of presence/absence by voice conversation.

FIG. 4 illustrates an example of changing a definition of presence/absence once having been set. For example, after a definition of presence/absence has been set in the example of FIG. 3, the user U1 says "My schedule has been moved up and I won't be at home in the morning, and I want a delivery person to come after 5:00 P.M." to the first information processing terminal 10 as illustrated in FIG. 4. The first information processing terminal 10 understands the contents of the speech by analyzing the voice uttered by the user U1, sets 5:00 P.M. as the start time of the "presence state" for the visit, and, for example, sets 9:00 P.M., which is the average bedtime of the user U1, as the end time of the "presence state". Then, the first information processing terminal 10 says "I understand. I have set possible visit time to a period from 5:00 P.M. to 9:00 P.M.", notifying the user U1 of the contents of setting.

Figure 5:
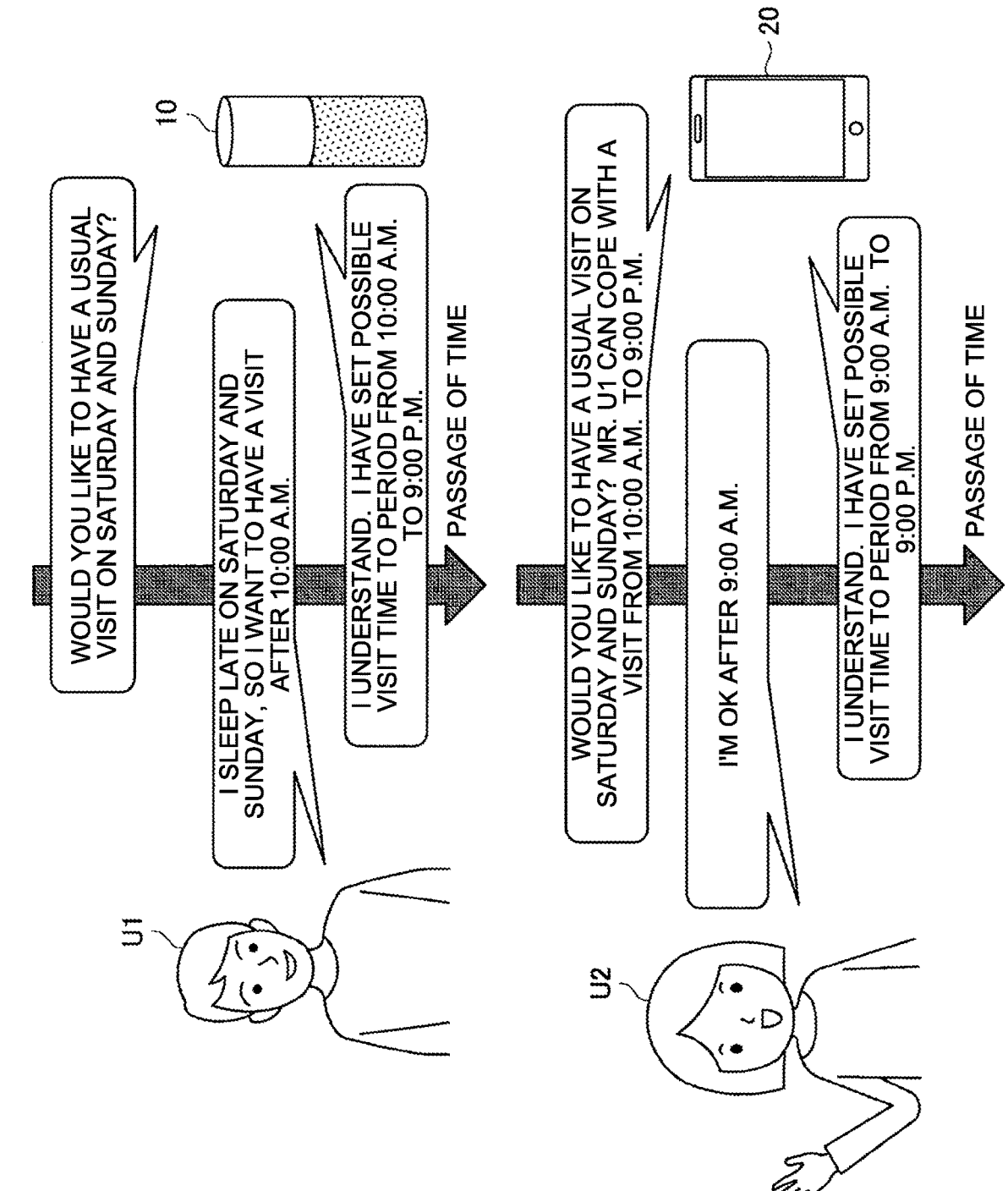
FIG. 5 is a diagram illustrating an example of setting a definition of presence/absence by voice conversation.

In the above description, the example in which the definition of presence/absence is set by one user has been described, but in the present embodiment, definitions of presence/absence may be set by a plurality of users. FIG. 5 illustrates an example in which definitions of presence/absence are set by a plurality of users. Note that in FIG. 5, the second information processing terminal 20 has the same function as that of the first information processing terminal 10, and the second information processing terminal 20 is also configured to set a definition of presence/absence. Firstly, the user U1 sets a definition of presence/absence as illustrated in FIG. 2. Then, the second information processing terminal 20 says to a user U2, "Would you like to have a usual visit on Saturday and Sunday. Mr. U1 will be able to cope with a visit from 10:00 A.M. to 9:00 P.M." On the other hand, the user U2 says "I'm OK after 9:00 A.M." Thus, the second information processing terminal 20 understands the contents of the speech by analyzing the voice uttered by the user U2, sets 9:00 A.M. on Saturday and Sunday as the start time of the "presence state" of the user U2, and, for example, sets 9:00 P.M., which is the average bedtime of the user U2, as the end time of the "presence state". Then, the second information processing terminal 20 says "I understand. I have set possible visit time to a period from 9:00 A.M. to 9:00 P.M.", notifying the user U2 of the contents of setting. Note that setting of the definition of presence/absence for a specific visit illustrated in FIG. 3 and changing the definition of presence/absence having been set once illustrated in FIG. 4 may also be achieved by a plurality of users.

Here, when there is a plurality of users at a visit destination (e.g., when the visit destination is a house and there is a family in the house), and where even one of the plurality of users is predicted to be in the "presence state", the visit destination is treated as "presence state", in the present embodiment. This makes a visit more efficient. That is, if one of the plurality of users is in the "presence state", the visitor can make a visit even if the other users are in the "absence state", and the visit is made more efficiently.

Note that when there is a plurality of users at a visit destination, the users may specify a user to be visited so that the prediction information about the presence/absence of only the specified user is set to be used for the processing. This makes it possible that, for example, when a user uses a delivery service, the user can set him/her-self as a receiver to receive a delivery that the user does not want the other family members to receive, and the delivery can be made on the basis of prediction information about the presence/absence of the user him/her-self. Note that when a user who is to be visited differs from a client who requests for a visit, the client who requests for a visit may specify the user who is to be visited. This makes it possible that, for example, in the delivery service, delivery is made on the basis of prediction information about the presence/absence of only a receiver specified by the client who requests for a visit. Furthermore, the visitor may also be able to specify a user to be visited. This makes it possible that, for example, even when there is a plurality of users at a visit destination, the visitor visits only when a desired user is in the presence state.

Furthermore, in the above, the example has been described in which the start time and end time of the "presence state" (or "absence state") are set. However, the contents of setting of the definition of presence/absence are not limited to this description. More specifically, the definition of presence/absence may be set on the basis of a user's action or state. For example, when the user is located within a predetermined distance from a visit destination (e.g., his/her house, company, or the like), the "presence state" may be set. This makes it possible for the user to cope with a visit if the user quickly returns to the visit destination in time for the visit. Furthermore, when the user is, for example, sleeping, bathing, or working, the "absence state" may be set. This makes it possible to prevent the user from being visited when the user is located at the visit destination but the user cannot substantially have the visit. Furthermore, in particular in the delivery service, when the user uses a package delivery locker service, the "presence state" may be set until the time at which the user arrives at a package delivery locker. This makes it possible for the user to receive a delivery smoothly.

Furthermore, in determining presence/absence, a user who is an exclusion target may be set. For example, a child under a predetermined age may be excluded in determining presence/absence. This makes it possible to prevent a visit by a visitor when there is only a child under a predetermined age at a visit destination.

(Functional Overview of Information Processing Server 40)

As described above, the information processing server 40 is configured to acquire the prediction information about the presence/absence of a user at each visit destination from the first information processing terminal 10 and determine a visit destination to be assigned for each visitor from a plurality of visit destinations on the basis of the information.

More specifically, the information processing server 40 sets a plurality of areas in a visit target area by a predetermined method. The method of setting the areas is not particularly limited. For example, an area may be set by dividing the visit target area into municipalities or the like. Then, the information processing server 40 counts the number of visit destinations located in the area per day, and if the number has a reasonable value compared to past visit records or the like, these visit destinations are determined as visit destinations to be assigned for a certain visitor. Note that the method of determining visit destinations to be assigned for each visitor is not limited thereto. For example, when an appropriate visit route cannot be created to determine a visit route in a subsequent process, the information processing server 40 may prepare assigned visit destinations again. In addition, the information processing server 40 may determine visit destinations to be assigned, in consideration of area information (e.g., weather forecast, traffic prediction, event schedule, or the like) including information such as a prediction result of a situation in the area, visitor information (e.g., years of experience in the business, the number of visits possible per day, etc.) including information about visitor's skill, experience, or the like, the purpose of the visit or an estimated work time at a visit destination, or the like.

Furthermore, as described above, the information processing server 40 is configured to determine a visit route on the basis of information about the assigned visit destinations for each visitor and the prediction information about presence/absence, the visit route enabling visits to all assigned visit destinations in a time period (i.e., a time period in which the assigned visit destinations are being set to the "presence state") in which users at the assigned visit destinations can cope with a visit.

More specifically, the information processing server 40 acquires the prediction information about presence/absence at the assigned visit destinations. Then the information processing server 40 calculates a route (i.e., the shortest route) from a plurality of routes passing through the assigned visit destinations (or near the assigned visit destinations), where the route enables visits in the time period in which the assigned visit destinations are being set to the "presence state" and takes the shortest time, and the shortest route is determined as the visit route. Here, the method of calculating the shortest route is not particularly limited. For example, in the information processing server 40, a known program (e.g., a car navigation program or the like) may be used, the program being configured to calculate the shortest route by specifying visit destinations and various parameters such as time periods in which users desire a visit. Note that as in the process of determining visit destinations to be assigned for each visitor, the information processing server 40 may determine a route to be assigned, in consideration of area information (e.g., weather forecast, traffic prediction, event schedule, or the like) including information such as a prediction result of a situation in the area, visitor information (e.g., years of experience in the business, the number of visits possible per day, etc.) including visitor's skill, experience, or the like, the purpose of the visit or an estimated work time at a visit destination, or the like.

Then, the information processing server 40 is configured to provide information about the assigned visit destinations for each visitor and the visit route to the third information processing terminal 30.

(Functional Overview of Third Information Processing Terminal 30)

The third information processing terminal 30 acquires information about assigned visit destinations for each visitor and a visit route from the information processing server 40 and identifies the position of the third information processing terminal 30 by using a position sensor (e.g., GNSS sensor or the like) provided in the third information processing terminal 30. Then, the third information processing terminal 30 is configured to cause the assigned visit destinations, the visit route, the position of the third information processing terminal 30, time periods of "presence states" and time periods of "absence states" at the assigned visit destinations to be displayed on the map information in a superimposed manner, by using this information. Note that an example of display by the third information processing terminal 30 will be described later.

<<1.4 Exemplary Functional Configuration of First Information Processing Terminal 10>>

In the above, the overview of the functions of the devices according to the present embodiment has been described. Next, an exemplary functional configuration of the first information processing terminal 10 will be described with reference to FIG. 6.

As illustrated in FIG. 6, the first information processing terminal 10 includes a display unit 110, a voice output unit 120, a voice input unit 130, an imaging unit 140, a sensor unit 150, a control unit 160, and a communication unit 170 and a storage unit 180. Furthermore, the control unit 160 includes a presence/absence prediction unit 161 and a presence/absence definition unit 162, and the storage unit 180 includes a user DB 181, a presence/absence definition DB 182, an action history DB 183, and a lifestyle DB 184.

(Display Unit 110)

The display unit 110 has a functional configuration outputting visual information such as an image or text. The display unit 110 is configured to output the visual information on the basis of control, for example, by the control unit 160 or the information processing server 40.

Therefore, the display unit 110 includes a display device that presents the visual information. Examples of the display device include a liquid crystal display (LCD) device, an organic light emitting diode (OLED), a touch panel, and the like. The display unit 110 may output the visual information by a projection function.

(Voice Output Unit 120)

The voice output unit 120 has a functional configuration outputting various sounds including voice speech. For example, the voice output unit 120 is configured to perform voice speech or the like to set a definition of presence/absence, on the basis of control by the control unit 160, the information processing server 40, or the like. Therefore, the voice output unit 120 includes a voice output device such as a speaker or amplifier.

(Voice Input Unit 130)

The voice input unit 130 has a functional configuration collecting sound information such as speech by a user, ambient sound generated around the first information processing terminal 10. The sound information collected by the voice input unit 130 is used for recognition of voice or surrounding environment by the control unit 160. The voice input unit 130 includes a microphone for collecting the sound information.

(Imaging Unit 140)

The imaging unit 140 has a functional configuration capturing image of a user or surrounding environment. An image captured by the imaging unit 140 is used for recognition of the user or recognition of surrounding environment by the control unit 160. The imaging unit 140 includes an imaging device that can capture an image. Note that the above image includes a moving image in addition to a still image.

(Sensor Unit 150)

The sensor unit 150 has a functional configuration collecting various pieces of sensed data about surrounding environment or a user's action or state. The sensed data collected by the sensor unit 150 is used for recognition of surrounding environment, recognition of a user's action, or recognition of a state by the control unit 160. Examples of sensors included in the sensor unit 150 are as described above.

(Control Unit 160)

The control unit 160 has a functional configuration controlling each configuration included in the first information processing terminal 10. For example, the control unit 160 controls activation and stop of each component. Furthermore, the control unit 160 is configured to control output from the display unit 110 and the voice output unit 120, by using a control signal generated by the control unit 160 or a control signal generated by the information processing server 40. In addition, the control unit 160 analyzes sensed data (including sound information, captured images, or the like), enabling recognition of a user who has spoken or a user whose image has been captured or recognition of surrounding environment of the first information processing terminal 10. Furthermore, the control unit 160 is configured to perform control in the same manner also by using sensed data acquired from an external device (e.g., the second information processing terminal 20, described later, a device arranged on or off the premises of a visit destination, or the like). Note that the contents of control by the control unit 160 are not limited to these descriptions.

(Presence/Absence Prediction Unit 161)

The presence/absence prediction unit 161 has a functional configuration that predicts the presence/absence of a user at a visit destination on the basis of sensed data. For example, as described above, the presence/absence prediction unit 161 estimates a user's action, predicts a user's action at a certain point of time in the future, or the like by analyzing the sensed data, and thus, the presence/absence of the user at the visit destination can be predicted. Note that the method of predicting the presence/absence of a user at a visit destination is not limited to this description. Furthermore, the presence/absence prediction unit 161 also functions as a providing unit that provides prediction information about the presence/absence of the user to the information processing server 40.

(Presence/Absence Definition Unit 162)

The presence/absence definition unit 162 has a functional configuration setting a definition of the presence/absence of a user on the basis of a user's input. For example, as described above, the presence/absence definition unit 162 sets the definition of the presence/absence of the user on the basis of the time (e.g., start time and end time of the "presence state"), a user's action or state, or the like. Note that the method for setting the definition of the presence/absence of the user is not limited to these description. For example, as described above, the presence/absence definition unit 162 may set a user who is an exclusion target, in determining presence/absence. The presence/absence definition unit 162 causes the presence/absence definition DB 182, described later, to store information about a definition of presence/absence. This makes it possible that the presence/absence prediction unit 161 predicts the presence/absence of the user, using the information.

(Communication Unit 170)

The communication unit 170 has a functional configuration performing information communication with the information processing server 40 via the network 50 and performing information communication with the second information processing terminal 20 via the network 51. For example, the communication unit 170 receives sensed data collected by the second information processing terminal 20. In addition, the communication unit 170 transmits prediction information about the presence/absence of the user output by the presence/absence prediction unit 161 to the information processing server 40. Note that information communicated by the communication unit 170 is not limited to these.

Furthermore, in communication performed by the communication unit 170 (particularly, communication with the information processing server 40), a predetermined encryption technology (e.g., wired equivalent privacy (WEP), Temporal Key Integrity Protocol (TKIP), Wi-Fi Protected Access (WPA), Advanced Encryption Standard (AES), or the like) is used to perform encryption processing. For example, the prediction information about the presence/absence of the user or the like is important information that is likely to be misused upon leaking, but encryption of communication of the communication unit 170 reduces the risk of such misuse.

(Storage Unit 180)

The storage unit 180 has a functional configuration storing various pieces of information. For example, the storage unit 180 stores various programs, various parameters, or the like used for the processing of the first information processing terminal 10. Note that the information stored in the storage unit 180 is not limited thereto.

(User DB 181)

The user DB 181 has a functional configuration storing various pieces of information about a user. For example, the user DB 181 stores user's physical characteristics (e.g., face image, iris image, fingerprint information, voice characteristics, or the like), attributes (e.g., name, relationship, gender, age, date of birth, occupation, address, or the like), or the like. Such information can be used for user recognition processing or the like. Note that information stored in the user DB 181 is not limited thereto.

(Presence/Absence Definition DB 182)

The presence/absence definition DB 182 has a functional configuration storing information about a definition of presence/absence generated by the presence/absence definition unit 162. Here, with reference to FIG. 7, an example of the information about a definition of presence/absence will be described (in FIG. 7, some of the user attributes (name, relationship, gender and age) stored in the user DB 181 are displayed).

As illustrated in FIG. 7, the presence/absence definition DB 182 stores "definition of presence state" and "definition of absence state", and these definitions include a definition relating to "action or state" and a definition relating to "time". For example, data D1 and data D2 in FIG. 7 are definitions relating to "action or state" in "definition of presence state", where "within 300 m from home (i.e., in a case where a user is located within 300 m from his home) is set to the data D1, and "when package delivery locker is reserved (i.e., when the user reserves the package delivery locker)" is set to the data D2. Data D3 and data D4 are definitions relating to "action or state" in "definition of absence state", where "during sleep, during bathing, during work" (i.e., when the user is sleeping, bathing, or working) is set to the data D3 and "during sleeping, during bathing" (i.e., when the user is sleeping or bathing) is set to the data D4.

Data D5 and data D6 are definitions relating to "time" in "definition of presence state", and "after 10:00 A.M." is set to the data D5 and "after 9:00 A.M. (user's home), before 9:00 P.M. (package delivery locker)" is set to the data D6. Note that the data D6 shows an example of a reservation of the package delivery locker by the user where 9:00 P.M. is set as the estimated time of arrival (i.e., the estimated time at which the user arrives at the package delivery locker). In other words, when the user reserves the package delivery locker, the time before 9:00 P.M. corresponds to "presence state", and the user, who arrives at the package delivery locker on time at 9:00 P.M., can receive a delivery appropriately. Data D7 and data D8 are definitions relating to "time" in "definition of absence state", and "after 9:00 P.M." is set to the data D7 and data D8.

Furthermore, data D9 and data D10 are information indicating whether the user is an exclusion target. In FIG. 7, a user U3 and a user U4 are set as the exclusion target. In other words, the user U3 and the user U4 are not subjected to processing relating to the presence state or absence state.

An example of the information about a definition of presence/absence has been described above. Note that the content of the information about a definition of presence/absence is not limited to the above.

(Action History DB 183)

The action history DB 183 has a functional configuration that stores information about a past action history of each user. For example, the action history DB 183 stores action history data that is information about user's past actions. For example, the action history DB 183 stores a plurality of user's past actions in association with sensed data obtained during each action (e.g., sensed data output from an acceleration sensor, gyro sensor, image sensor, atmospheric pressure sensor, pressure sensor, or the like). Therefore, the features of each user's action becomes clear, and the presence/absence prediction unit 161 can estimate a user's action by analyzing the sensed data, using the action history data. Note that the action history DB 183 stores not raw sensed data obtained during an action but features of the sensed data obtained during each action and extracted by a predetermined analysis. This makes it possible to reduce the amount of data stored.

(Lifestyle DB 184)

The lifestyle DB 184 has a functional configuration storing lifestyle data that is user's lifestyle information generated on the basis of action history data stored by the action history DB 183. The lifestyle data includes, for example, information about actions performed by a user at each time of the day (e.g., an action content, action frequency, user's status during an action, etc.), the information being gathered by the day of the week (e.g., Monday to Sunday, weekday or holiday, or the like), the date (e.g., the first day, the thirty-first day, etc.), the month (e.g., January, December, etc.), or the year (e.g., 2017). In other words, the lifestyle data includes information about a lifestyle on each day of the week, lifestyle on weekdays, lifestyle on holidays, lifestyle on a specific day, lifestyle in a specific month, lifestyle in a specific year, or the like of each user. The information is used for predicting a user's action by the presence/absence prediction unit 161. For example, in a case of estimating the user's action, the presence/absence prediction unit 161 is configured to compare information about the time, the day of the week, date, month, or year where the user takes the action with the lifestyle data to predict a user's action that is likely to be taken at a time point in the future. Note that the action history DB 183 may be used for a process of predicting a user's action by storing information equivalent to the lifestyle data in the action history DB 183.

The exemplary functional configuration of the first information processing terminal 10 has been described above. Note that the functional configuration described above with reference to FIG. 6 is merely an example, and the functional configuration of the first information processing terminal 10 is not limited to such example. For example, the first information processing terminal 10 may not necessarily include all of the configurations illustrated in FIG. 6. For example, the first information processing terminal 10 can have a configuration without the display unit 110, the imaging unit 140, the sensor unit 150, or the like. Furthermore, the functional configuration of the first information processing terminal 10 is flexibly changeable in shape according to the specification or operation thereof.

<<1.5. Exemplary Functional Configuration of Second Information Processing Terminal 20>>

The exemplary functional configuration of the first information processing terminal 10 has been described above. Next, an exemplary functional configuration of the second information processing terminal 20 will be described with reference to FIG. 8.

Figure 8:
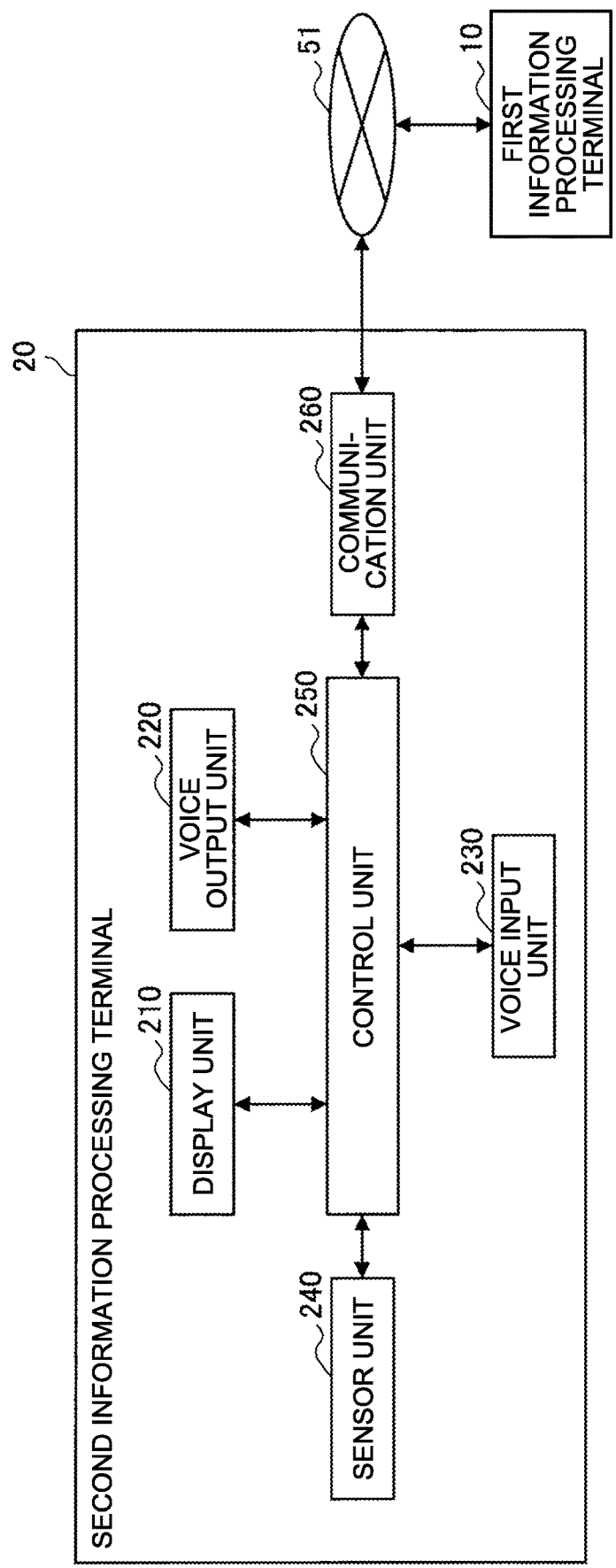
FIG. 8 is a block diagram illustrating an exemplary functional configuration of a second information processing terminal 20.

As illustrated in FIG. 8, the second information processing terminal 20 includes a display unit 210, a voice output unit 220, a voice input unit 230, a sensor unit 240, a control unit 250, and a communication unit 260.

(Display Unit 210)

The display unit 210 has a functional configuration outputting visual information such as an image or text. The display unit 210 is configured to output the visual information on the basis of control, for example, by the control unit 250. Note that devices and the like included in the display unit 210 are the same as those in the display unit 110 of the first information processing terminal 10, and a description thereof will be omitted.

(Voice Output Unit 220)

The voice output unit 220 has a functional configuration outputting various sounds including voice speech. For example, the voice output unit 220 is configured to perform voice speech or the like to set a definition of presence/absence, on the basis of control by the control unit 250. Therefore, the voice output unit 220 includes a voice output device such as a speaker or amplifier.

(Voice Input Unit 230)

The voice input unit 230 has a functional configuration collecting sound information such as speech by a user, ambient sound generated around the second information processing terminal 20. The sound information collected by the voice input unit 230 is provided to the first information processing terminal 10 and used for recognition of voice or surrounding environment by the first information processing terminal 10. The voice input unit 230 includes a microphone for collecting the sound information.

(Sensor Unit 240)

The sensor unit 240 has a functional configuration collecting various pieces of sensed data about surrounding environment or a user's action or state. The sensed data collected by the sensor unit 240 is provided to the first information processing terminal 10 and used for recognition of surrounding environment, recognition of a user's action, or recognition of a state by the first information processing terminal 10. Examples of sensors included in the sensor unit 240 are as described above.

(Control Unit 250)

The control unit 250 has a functional configuration controlling each configuration included in the second information processing terminal 20. For example, the control unit 250 controls activation and stop of each component. Furthermore, the control unit 250 is configured to control output from the display unit 210 and the voice output unit 220, by using a control signal generated by the control unit 250. Note that the contents of control by the control unit 250 are not limited to these descriptions.

(Communication Unit 260)

The communication unit 260 has a functional configuration performing information communication with the first information processing terminal 10 via the network 51. For example, the communication unit 260 transmits sensed data collected by the sensor unit 240 to the first information processing terminal 10. Note that information communicated by the communication unit 260 is not limited to these. Furthermore, in communication performed by the communication unit 260, a predetermined encryption technology is used to perform encryption processing, as is in the communication unit 170 of the first information processing terminal 10.

The exemplary functional configuration of the second information processing terminal 20 has been described above. Note that the functional configuration described above with reference to FIG. 8 is merely an example, and the functional configuration of the second information processing terminal 20 is not limited to such example. For example, the second information processing terminal 20 may not necessarily include all of the configurations illustrated in FIG. 8. For example, the second information processing terminal 20 can have a configuration without the display unit 210, the voice output unit 220, the voice input unit 230, or the like. Furthermore, the functional configuration of the second information processing terminal 20 is flexibly changeable in shape according to the specification or operation thereof.

<<1.6. Exemplary Functional Configuration of Information Processing Server 40>>

The exemplary functional configuration of the second information processing terminal 20 has been described above. Next, an exemplary functional configuration of the information processing server 40 will be described with reference to FIG. 9.

Figure 9:
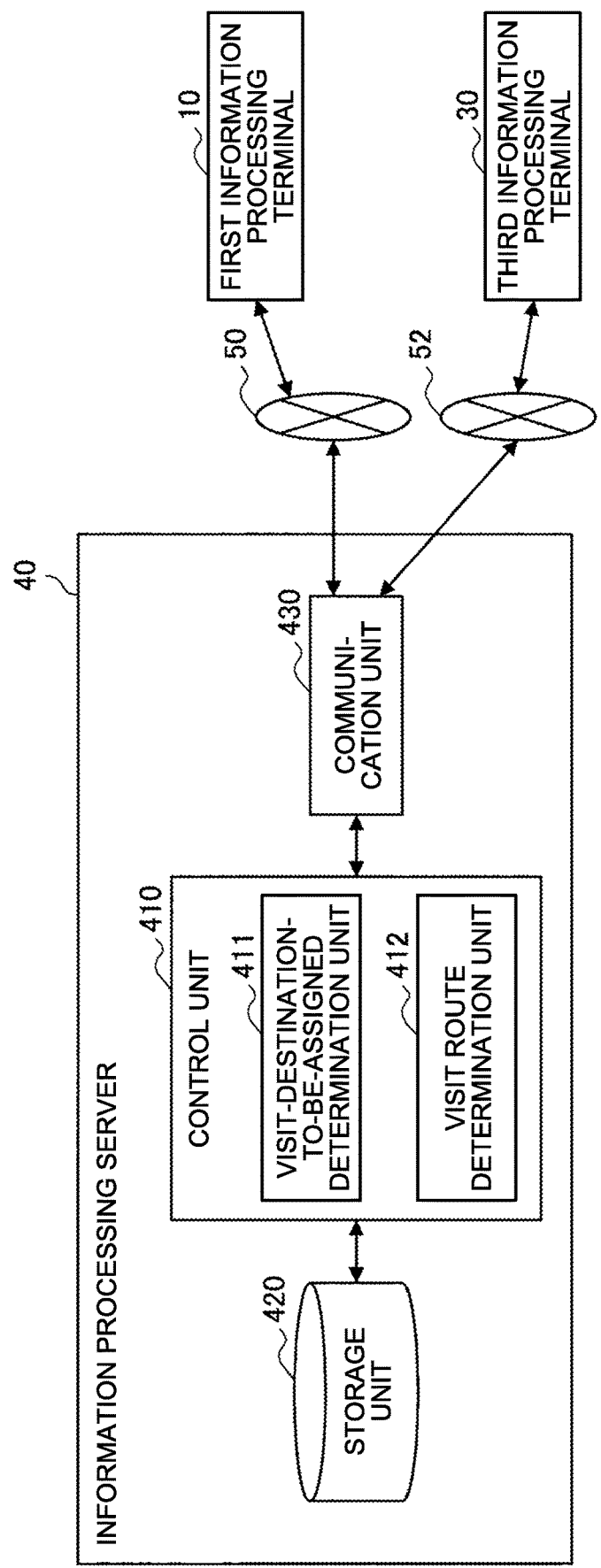
FIG. 9 is a block diagram illustrating an exemplary functional configuration of an information processing server 40.

As illustrated in FIG. 9, the information processing server 40 includes a control unit 410, a storage unit 420, and a communication unit 430. Furthermore, the control unit 410 includes a visit-destination-to-be-assigned determination unit 411 and a visit route determination unit 412.

(Control Unit 410)

The control unit 410 has a functional configuration controlling each configuration included in the information processing server 40. For example, the control unit 410 controls activation and stop of each component. Furthermore, the control unit 410 is configured to control output from a display unit (not illustrated), by using a control signal generated by the control unit 410. Note that the contents of control by the control unit 410 are not limited to these descriptions.

(Visit-Destination-to-be-Assigned Determination Unit 411)

The visit-destination-to-be-assigned determination unit 411 has a functional configuration determining a visit destination to be assigned for each visitor, on the basis of prediction information about the presence/absence of a user at each visit destination, the prediction information about the presence/absence being acquired from a plurality of first information processing terminals 10. An example of the method of determining visit destinations to be assigned for each visitor is the same as that described in the preceding "Functional overview of information processing server 40", and a description thereof will be omitted. The visit-destination-to-be-assigned determination unit 411 provides information about determined assigned visit destinations for each visitor to the visit route determination unit 412 and the third information processing terminal 30.

(Visit Route Determination Unit 412)

The visit route determination unit 412 has a functional configuration determining a visit route. More specifically, the visit route determination unit 412 is configured to determine a visit route on the basis of information about the assigned visit destinations for each visitor and information about presence/absence, the visit route enabling visits to all assigned visit destinations in a time period in which the assigned visit destinations are being set to the "presence state". An example of the method for determining a visit route is as described in the preceding "Functional overview of information processing server 40", and a description thereof will be omitted. The visit route determination unit 412 provides information about the visit route to the third information processing terminal 30.

(Storage Unit 420)

The storage unit 420 has a functional configuration storing various pieces of information used for the processing of the visit-destination-to-be-assigned determination unit 411 or the visit route determination unit 412. For example, the storage unit 420 may store area information (e.g., weather forecast, traffic prediction, event schedule, or the like) including information such as a prediction result of a situation in each visit area, visitor information (e.g., years of experience in the business, the number of visits possible per day, etc.) including information about visitor's skill, experience, or the like, or information about the purpose of the visit, an estimated work time at a visit destination, or the like. Note that the information stored in the storage unit 420 is not limited thereto.

(Communication Unit 430)

The communication unit 430 has a functional configuration performing information communication with the first information processing terminal 10 via the network 50 and performing information communication with the third information processing terminal 30 via the network 52. More specifically, the communication unit 430 receives prediction information about the presence/absence of a user at each visit destination from the first information processing terminal 10 (i.e., also functions as an acquisition unit that acquires the prediction information about the presence/absence of a user at each visit destination). In addition, the communication unit 430 transmits, to the third information processing terminal 30, information about an assigned visit destination having been determined by the visit-destination-to-be-assigned determination unit 411 and information about a visit route determined by the visit route determination unit 412. Note that information communicated by the communication unit 430 is not limited to these. Furthermore, in communication performed by the communication unit 430, a predetermined encryption technology is used to perform encryption processing, as is in the communication unit 170 of the first information processing terminal 10.

The exemplary functional configuration of the information processing server 40 has been described above. Note that the functional configuration described above with reference to FIG. 9 is merely an example, and the functional configuration of the information processing server 40 is not limited to such example. For example, the information processing server 40 may not necessarily include all of the configurations illustrated in FIG. 9. Furthermore, the functional configuration of the information processing server 40 is flexibly changeable in shape according to the specification or operation thereof.

<<1.7. Exemplary Functional Configuration of Third Information Processing Terminal 30>>

The exemplary functional configuration of the information processing server 40 has been described above. Next, an exemplary functional configuration of the third information processing terminal 30 will be described with reference to FIG. 10.

Figure 10:
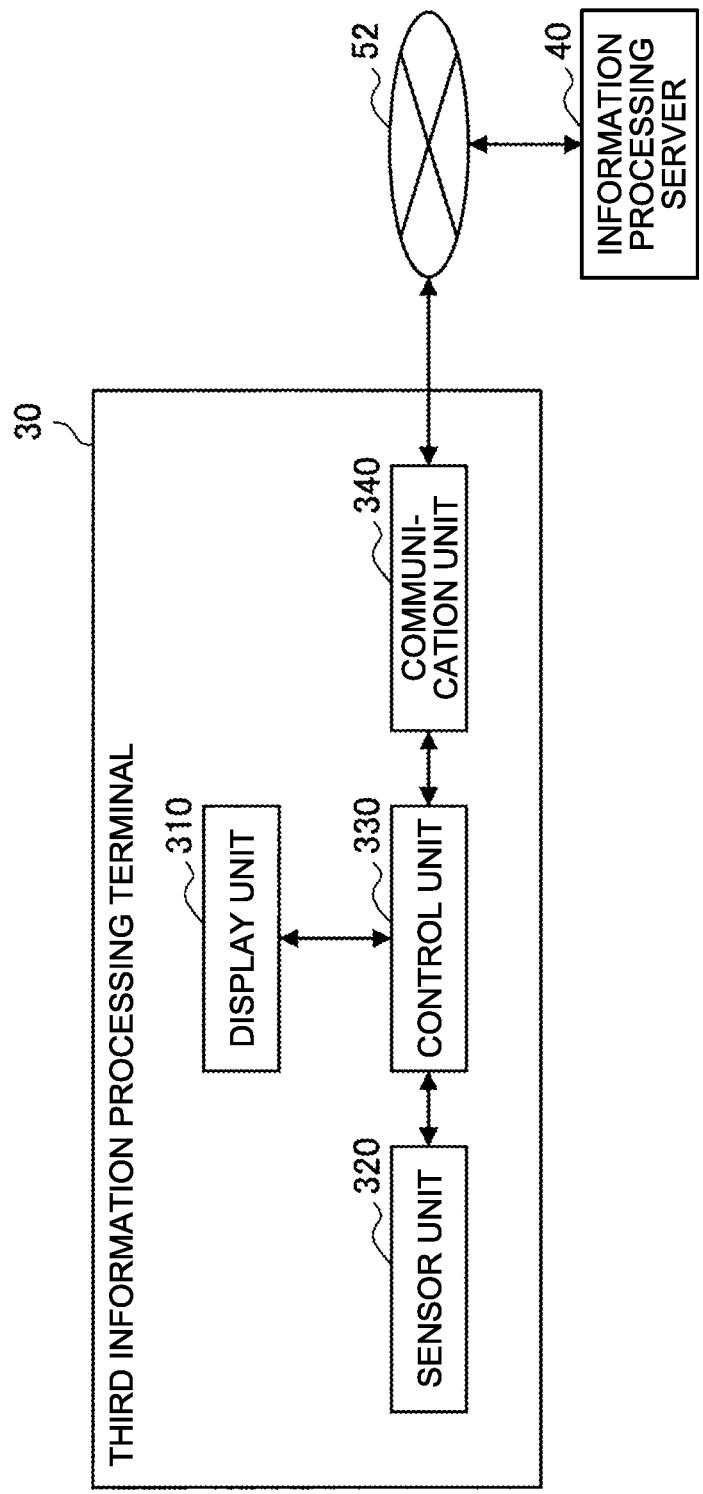
FIG. 10 is a block diagram illustrating an exemplary functional configuration of a third information processing terminal 30.

As illustrated in FIG. 10, the third information processing terminal 30 includes a display unit 310, a sensor unit 320, a control unit 330, and a communication unit 340.

(Display Unit 310)

The display unit 310 has a functional configuration outputting visual information such as an image or text. The display unit 310 is configured to output the visual information on the basis of control, for example, by the control unit 330. Note that devices and the like included in the display unit 310 are the same as those in the display unit 110 of the first information processing terminal 10, and a description thereof will be omitted.

(Sensor Unit 320)

The sensor unit 320 has a functional configuration collecting various pieces of sensed data about surrounding environment or visitor's action or state. In particular, the sensor unit 320 includes a position sensor (e.g., GNSS sensor or the like), and the sensed data of the position sensor is used for processing of identifying the position of the third information processing terminal 30. Note that the sensor unit 320 may include a sensor the same as those of the first information processing terminal 10 and the second information processing terminal 20.

(Control Unit 330)

The control unit 330 has a functional configuration controlling each configuration included in the third information processing terminal 30. For example, the control unit 330 controls activation and stop of each component. Furthermore, the control unit 330 is configured to control output from the display unit 310, by using a control signal generated by the control unit 330. Note that the contents of control by the control unit 330 are not limited to these descriptions.

(Communication Unit 340)

The communication unit 340 has a functional configuration performing information communication with the information processing server 40 via the network 52. More specifically, the communication unit 340 receives information about an assigned visit destination and information about a visit route, from the information processing server 40 (i.e., also functions as an acquisition unit that acquires the information about an assigned visit destination and information about a visit route). Note that information communicated by the communication unit 340 is not limited to these. Furthermore, in communication performed by the communication unit 340, a predetermined encryption technology is used to perform encryption processing, as is in the communication unit 170 of the first information processing terminal 10.

The exemplary functional configuration of the third information processing terminal 30 has been described above. Note that the functional configuration described above with reference to FIG. 10 is merely an example, and the functional configuration of the third information processing terminal 30 is not limited to such example. Here, since the third information processing terminal 30 handles prediction information about the presence/absence of a user, and if a malicious third party acquires the third information processing terminal 30, there is a possibility that the third information processing terminal 30 may be used for a crime such as burglary. Therefore, in order to prevent a crime to be committed by the third party, the third information processing terminal 30 may have a predetermined user authentication function including biometric authentication (e.g., fingerprint authentication or iris authentication) or a function automatically locking the third information processing terminal 30 when a visitor is away from the third information processing terminal 30 by a predetermined distance or more. Furthermore, the third information processing terminal 30 may not necessarily include all of the configurations illustrated in FIG. 10. Furthermore, the functional configuration of the third information processing terminal 30 is flexibly changeable in shape according to the specification or operation thereof.

<<1.8. Procedures of Processes>>

The exemplary functional configuration of the third information processing terminal 30 has been described above. Next, a procedure of a process performed by each device will be described.

(Process of Setting Definition of Presence/Absence)

Figure 11:
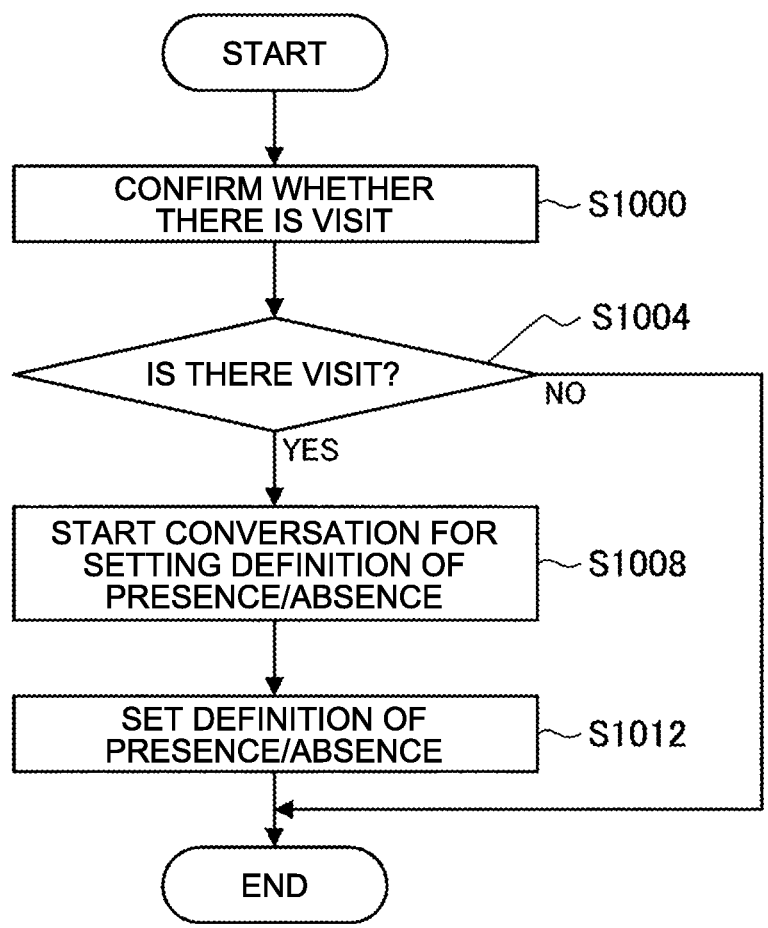
FIG. 11 is a flowchart illustrating an example of a procedure of a process of setting a definition of presence/absence, the process being performed by the first information processing terminal 10.

Firstly, with reference to FIG. 11, an example of a procedure of a process of setting a definition of presence/absence by the first information processing terminal 10 will be described. FIG. 11 illustrates an example of a procedure of a process (see FIG. 3) of setting a definition of presence/absence for a specific visit.

In step S1000, the presence/absence definition unit 162 of the first information processing terminal 10 confirms whether there is a visit within a predetermined period (e.g., today, next day, or the like). When there is a visit within a predetermined period (step S1004/Yes), the definition of presence/absence definition unit 162 controls the voice output unit 120 to start a conversation for setting a definition of presence/absence and have, for example, a conversation with a user as illustrated in FIG. 3. In step S1012, the presence/absence definition unit 162 analyzes the voice uttered by the user to understand the contents of the speech and set the definition of presence/absence, and a series of process steps ends. For example, the presence/absence definition unit 162 adds, changes, or deletes the definition of presence/absence. Note that in step S1004, when there is no visit within the predetermined period (step S1004/No), the processing of steps S1008 and S1012 are not performed.

Furthermore, the process of setting the definition of presence/absence for a specific visit (see FIG. 3) has been described with reference to FIG. 11, but a process of setting a definition of presence/absence for a general visit (see FIG. 2), a process of changing a definition of presence/absence that has been set once (see FIG. 4), and a process of setting definitions of presence/absence by a plurality of users (see FIG. 5) are also achievable by partially changing the flowchart of FIG. 11. For example, the process of setting a definition of presence/absence for a general visit (see FIG. 2) is achieved by processing of steps S1008 and S1012 of FIG. 11.

(Process of Predicting Presence/Absence)

Figure 12:
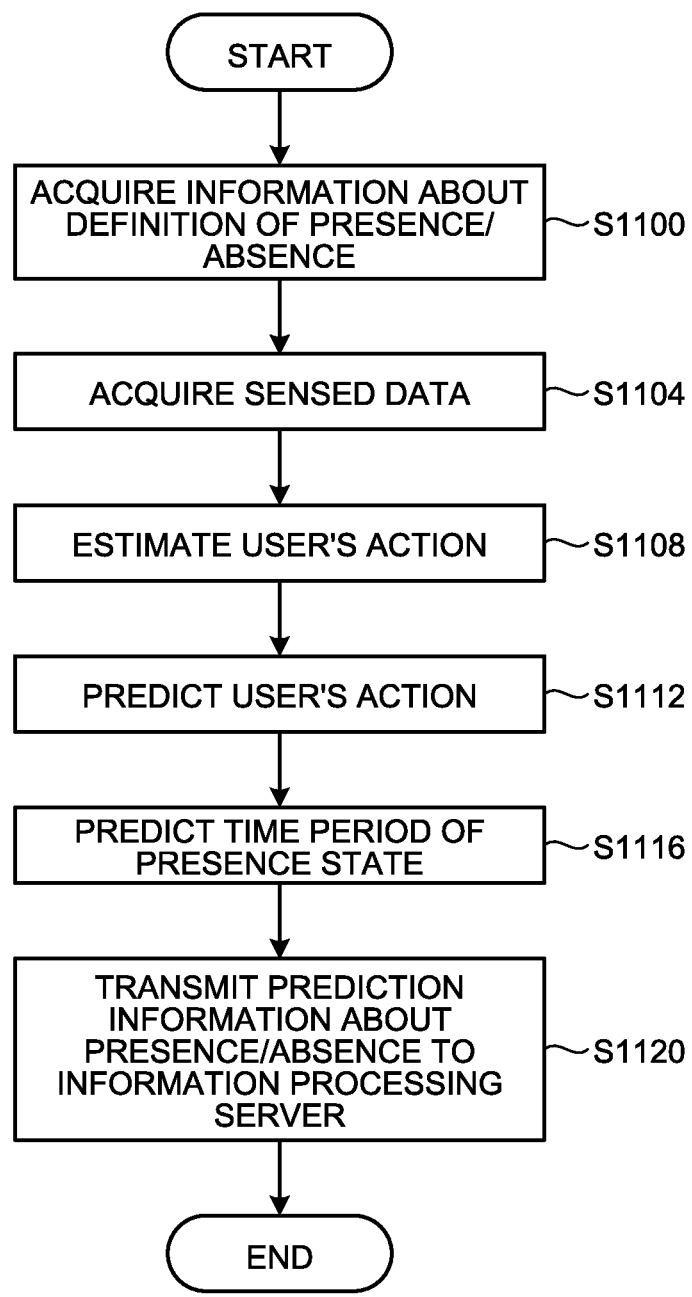
FIG. 12 is a flowchart illustrating an example of a procedure of a process of predicting presence/absence, the process being performed by the first information processing terminal 10.

Next, with reference to FIG. 12, an example of a process of predicting presence/absence by the first information processing terminal 10 will be described.

In step S1100, the presence/absence prediction unit 161 of the first information processing terminal 10 acquires information about a definition of presence/absence from the presence/absence definition DB 182. In step S1104, the presence/absence prediction unit 161 acquires sensed data output by a sensor of the sensor unit 150 or of an external device (including the second information processing terminal 20).

In step S1108, the presence/absence prediction unit 161 estimates a user's action by analyzing the sensed data. A procedure of a process of estimating a user's action will be described later with reference to FIG. 13. In step S1112, the presence/absence prediction unit 161 performs prediction of a user's action on the basis of a result of the estimation of the user's action. The procedure of a process of predicting a user's action will be described later with reference to FIG. 14.

In step S1116, the presence/absence prediction unit 161 predicts a time period in which visit destinations are in the presence state, on the basis of a result of the prediction of the user's action. In step S1120, the presence/absence prediction unit 161 controls the communication unit 170 to transmit prediction information about presence/absence to the information processing server 40, whereby a series of process steps ends.

(Process of Estimating User's Action)

Figure 13:
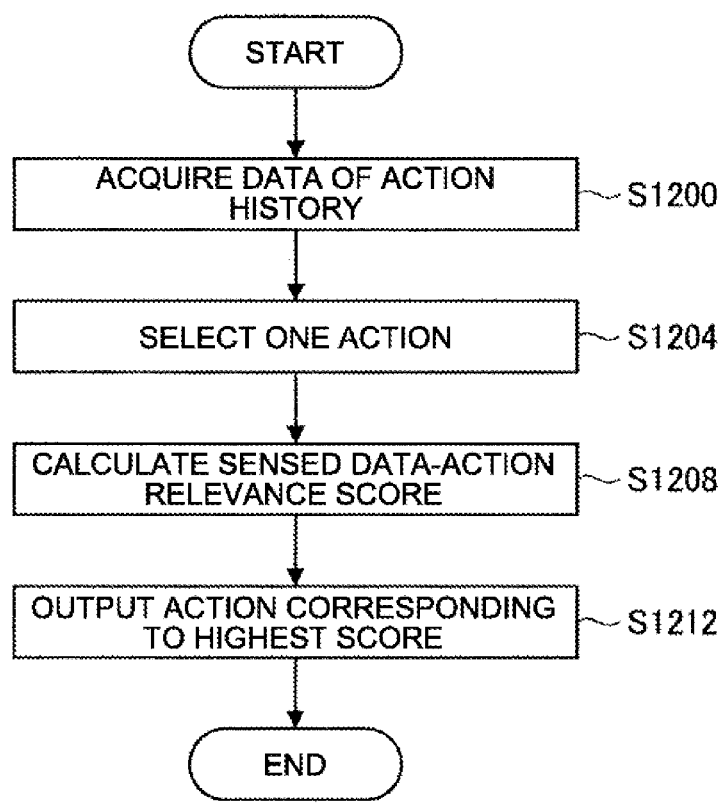
FIG. 13 is a flowchart illustrating an example of a procedure of a process of estimating a user's action, the process being performed by the first information processing terminal 10.

Next, with reference to FIG. 13, an example of a procedure of the process of estimating a user's action, illustrated in step S1108 of FIG. 12, will be described.

In step S1200, the presence/absence prediction unit 161 of the first information processing terminal 10 acquires data of an action history of a processing target user from the action history DB 183. Then, the presence/absence prediction unit 161 selects one action from a plurality of actions included in the action history data in step S1204 and calculates a sensed data-action relevance score being an index value indicating a relevance between the sensed data and the action in step S1208. The presence/absence prediction unit 161 performs the processing of step S1204 and step S1208 on all actions included in the action history data. In step S1212, the presence/absence prediction unit 161 outputs an action corresponding to the highest score, and a series of process steps ends.

(Process of Estimating User's Action)

Figure 14:
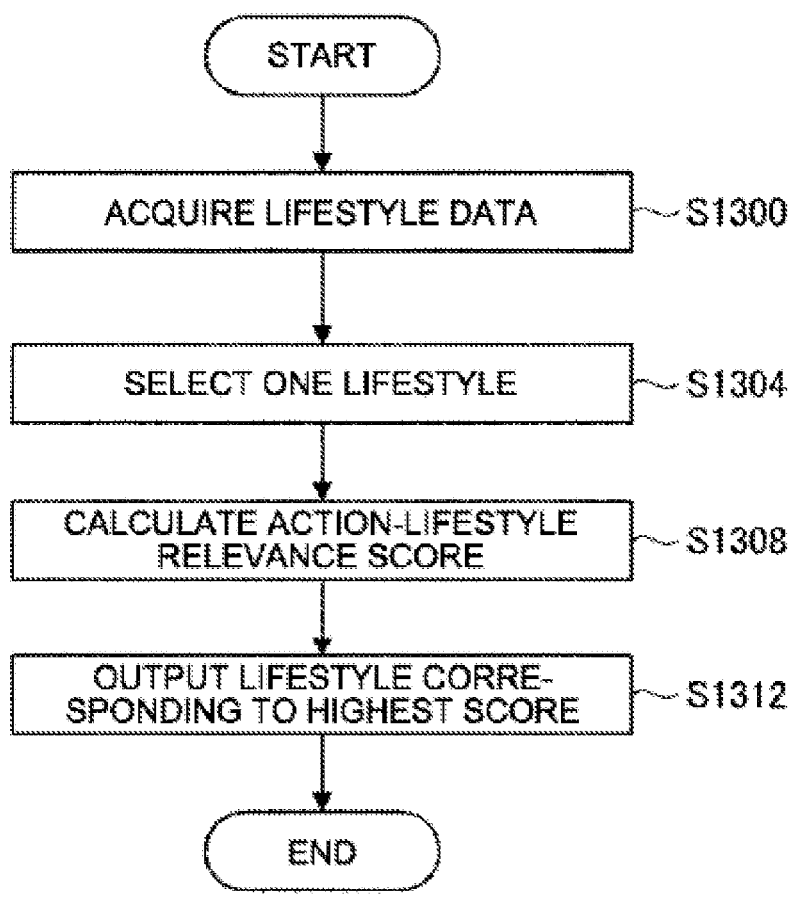
FIG. 14 is a flowchart illustrating an example of a procedure of a process of predicting a user's action, the process being performed by the first information processing terminal 10.

Next, with reference to FIG. 14, an example of a procedure of the process of predicting a user's action, illustrated in step S1112 of FIG. 12, will be described.

In step S1300, the presence/absence prediction unit 161 of the first information processing terminal 10 acquires lifestyle data of the processing target user from the lifestyle DB 184. Then, the presence/absence prediction unit 161 selects one lifestyle from a plurality of lifestyles included in the lifestyle data in step S1304 and calculates an action-lifestyle relevance score being an index value indicating a relevance between an estimated action and the lifestyle in step S1308. The presence/absence prediction unit 161 performs the processing of step S1304 and step S1308 on all lifestyles included in the lifestyle data. In step S1312, the presence/absence prediction unit 161 outputs a lifestyle corresponding to the highest score, and a series of process steps ends.

(Process of Transmitting Information About Assigned Visit Destinations and a Visit Route)

Figure 15:
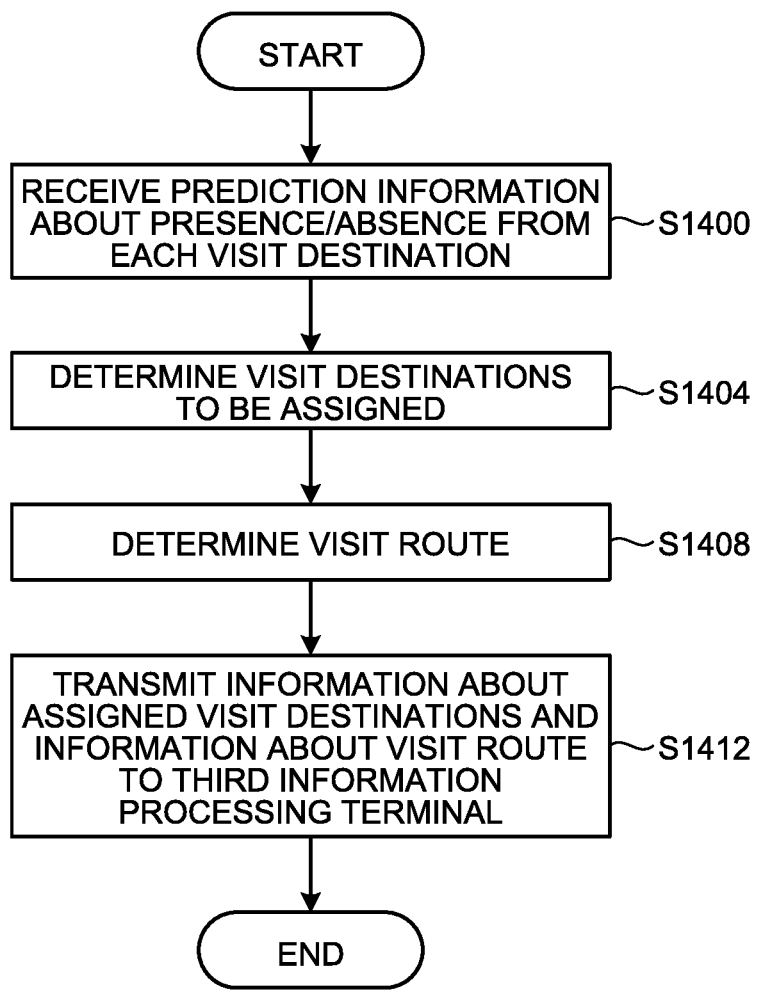
FIG. 15 is a flowchart illustrating an example of a procedure of a process of transmitting information about assigned visit destinations and a visit route, the process being performed by the information processing server 40.

Next, with reference to FIG. 15, an example of a procedure of a process of transmitting information about assigned visit destinations and a visit route will be described, the process being performed by the information processing server 40.

In step S1400, the communication unit 430 of the information processing server 40 receives prediction information about presence/absence from a first information processing terminal 10 at each visit destination. In step S1404, the visit-destination-to-be-assigned determination unit 411 determines visit destinations to be assigned for each visitor on the basis of the prediction information about presence/absence. A procedure of a process of determining a visit destination to be assigned will be described later with reference to FIG. 16. In step S1408, the visit route determination unit 412 determines a visit route on the basis of information about assigned visit destinations for each visitor and the prediction information about presence/absence. A procedure of a process of determining a visit route will be described later with reference to FIG. 17. In step S1412, the communication unit 430 transmits information about the assigned visit destinations and the visit route to the third information processing terminal 30, and a series of process steps ends.

(Process of Determining a Visit Destination to be Assigned)

Figure 16:
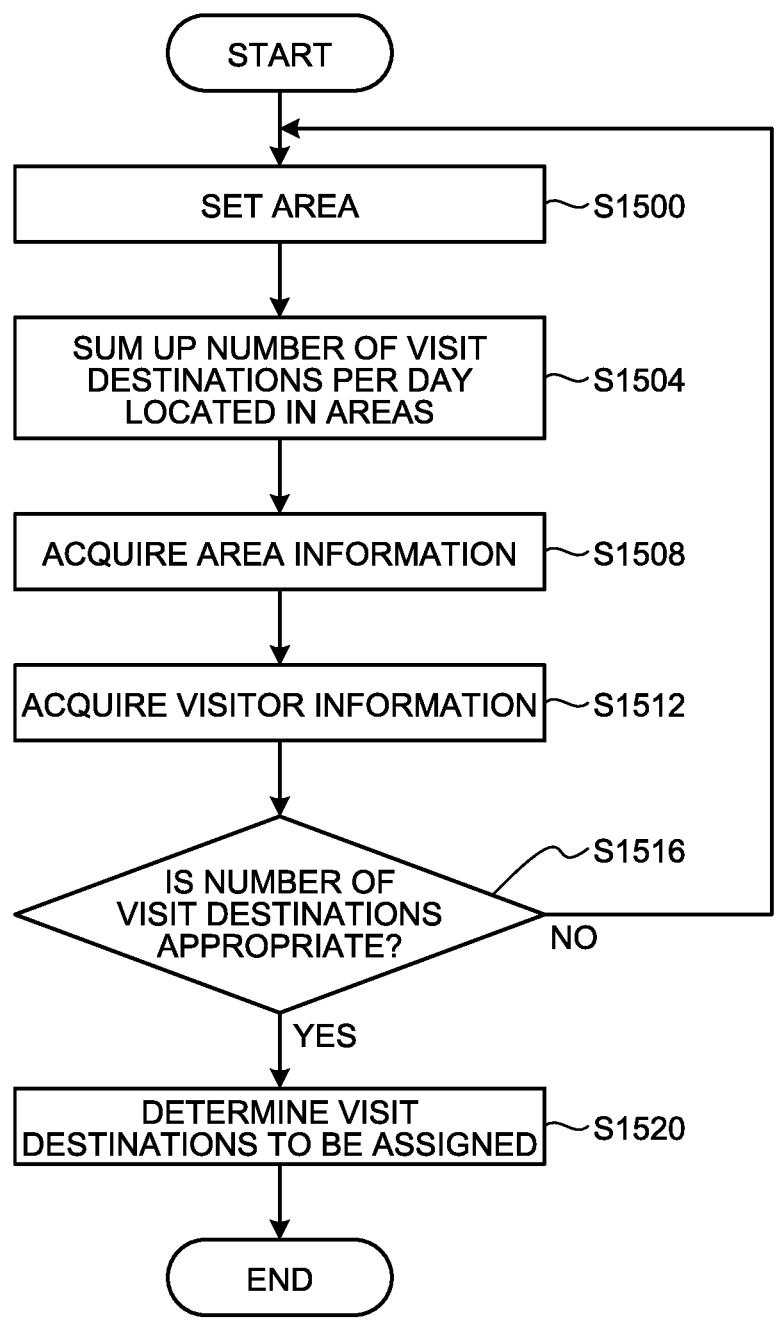
FIG. 16 is a flowchart illustrating an example of a procedure of a process of determining a visit destination to be assigned, the process being performed by the information processing server 40.

Next, with reference to FIG. 16, an example of a procedure of the process of determining a visit destination to be assigned, illustrated in step S1404 of FIG. 15, will be described.

In step S1500, the visit-destination-to-be-assigned determination unit 411 of the information processing server 40 sets areas in a visit target area by a predetermined method. For example, the visit-destination-to-be-assigned determination unit 411 divides the visit target area into a plurality of municipalities or the like to set the areas. In step S1504, the visit-destination-to-be-assigned determination unit 411 sums up the number of visit destinations per day located in these areas. In step S1508, the visit-destination-to-be-assigned determination unit 411 acquires area information (e.g., weather forecast, traffic prediction, event schedule, or the like) including information such as a prediction result of situations in the areas. In step S1512, the visit-destination-to-be-assigned determination unit 411 acquires visitor information (e.g., years of experience in the business, the number of visits possible per day, etc.) including information about visitor's skill, experience, or the like.

In step S1516, the visit-destination-to-be-assigned determination unit 411 determines the appropriateness of the number of visit destinations located in the areas on the basis of the area information, the visitor information, past visit results, or the like. When the number of visit destinations located in the areas is appropriate (step S1516/Yes), the visit-destination-to-be-assigned determination unit 411 determines visit destinations located in each area as the assigned visit destinations in step S1520, and a series of process steps ends. If the number of visit destinations located in the areas is not appropriate (step S1516/No), the process returns to step S1500, and processing after setting the areas are performed again.

(Process of Determining a Visit Route)

Figure 17:
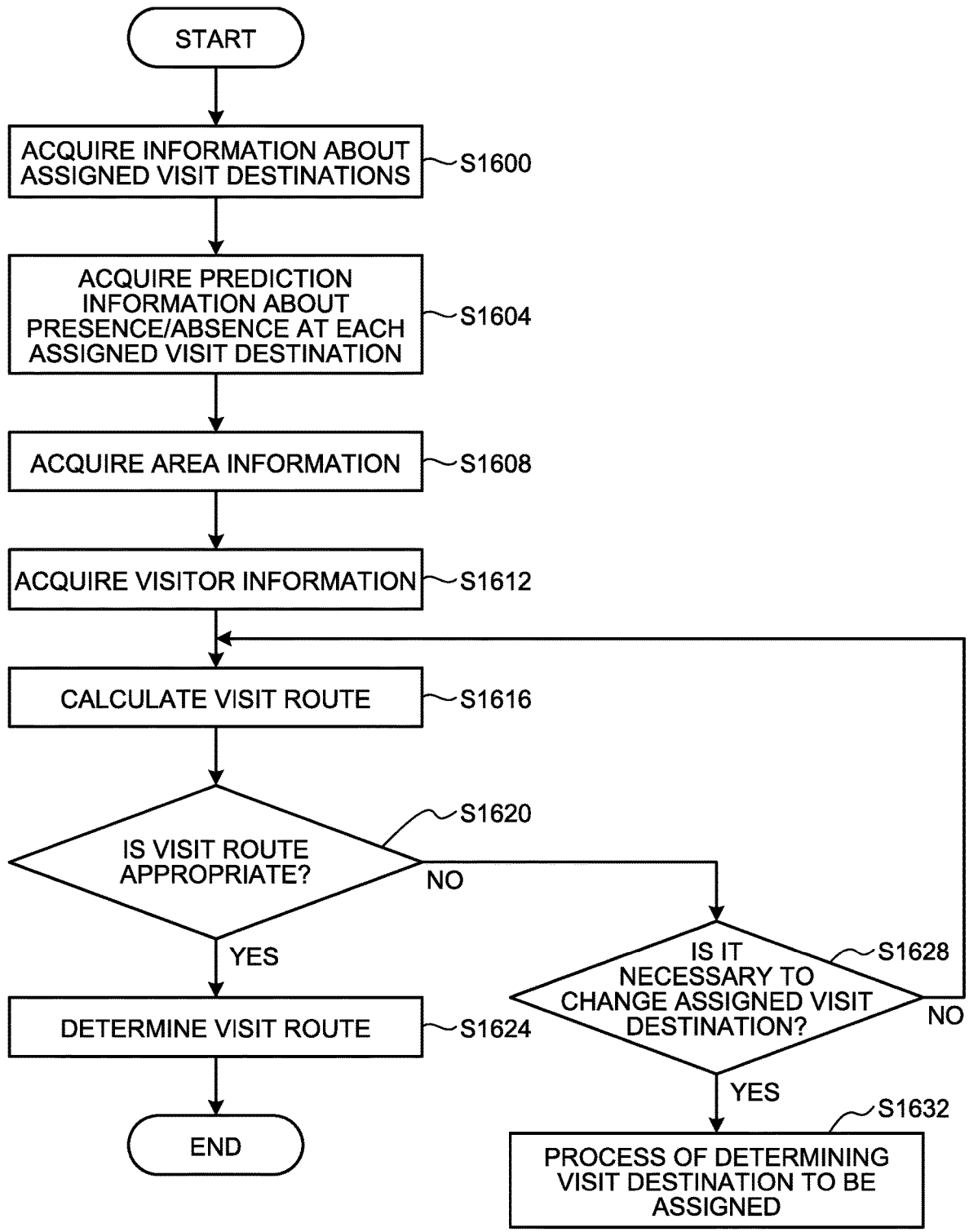
FIG. 17 is a flowchart illustrating an example of a procedure of a process of determining a visit route, the process being performed by the information processing server 40.

Next, with reference to FIG. 17, an example of a procedure of the process of determining a visit route, illustrated in step S1408 of FIG. 15, will be described.

In step S1600, the visit route determination unit 412 of the information processing server 40 acquires information about the assigned visit destinations having been determined by the visit-destination-to-be-assigned determination unit 411. In step S1604, the visit route determination unit 412 acquires prediction information about presence/absence at each assigned visit destination provided by a first information processing terminal 10. In step S1608, the visit route determination unit 412 acquires area information (e.g., weather forecast, traffic prediction, event schedule, or the like) including a prediction result of situations in the areas. In step S1612, the visit route determination unit 412 acquires visitor information (e.g., years of experience in the business, the number of visits possible per day, etc.) including visitor's skill, experience, or the like.

In step S1616, the visit route determination unit 412 calculates the shortest route, as a visit route, from a plurality of routes passing through the assigned visit destinations (or near the assigned visit destinations), where the shortest route enables visits in a time period in which the assigned visit destinations are being set to the "presence state". In step S1620, the visit route determination unit 412 determines the appropriateness of the visit route on the basis of the area information and the visitor information. If the visit route is appropriate (step S1620/Yes), in step S1624, the visit route determination unit 412 determines the calculated shortest route as the visit route, and a series of process steps ends.

If the visit route is not appropriate (step S1620/No), the visit route determination unit 412 determines whether an assigned visit destination needs to be changed to determine an appropriate visit route, in step S1628. If it is necessary to change the assigned visit destination (step S1628/Yes), the process of determining a visit destination to be assigned, illustrated in FIG. 16, is performed again in step S1632. If it is unnecessary to change any assigned visit destination (step S1628/No), the process returns to step S1616, and processing after the calculation of the visit route is performed again.

(Process of Changing Assigned Visit Destination or Visit Route)

Figure 18:
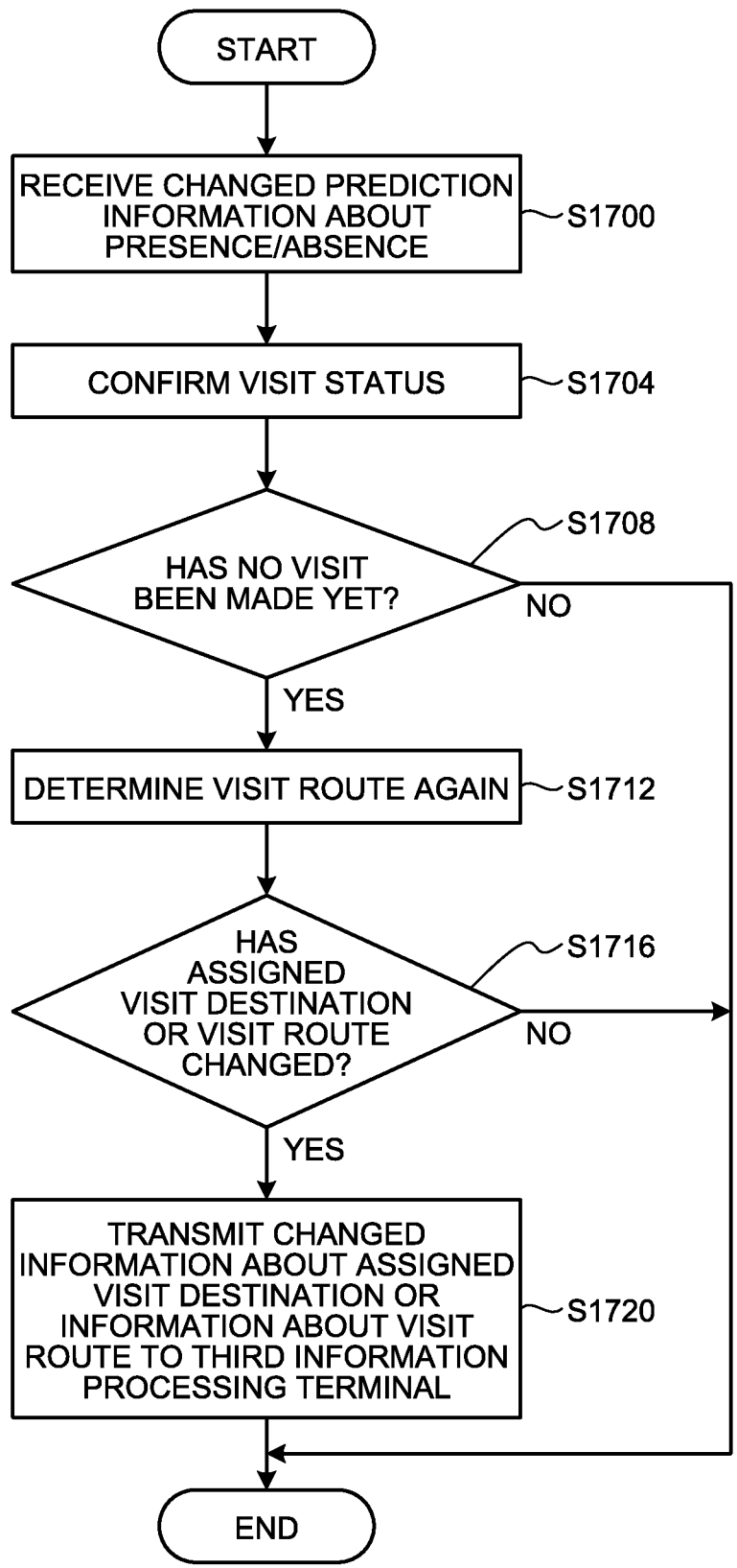
FIG. 18 is a flowchart illustrating an example of a procedure of a process of changing an assigned visit destination or visit route, the process being performed by the information processing server 40.

Next, with reference to FIG. 18, an example of a process of changing an assigned visit destination or visit route will be described. More specifically, when prediction information about presence/absence at an assigned visit destination, the prediction information being provided from the first information processing terminal 10, is changed, the information processing server 40 may need to change an assigned visit destination or the visit route. The information processing server 40 is configured to change the assigned visit destination or the visit route by performing a process illustrated in FIG. 18, in such a case.

In step S1700, the communication unit 430 of the information processing server 40 receives changed prediction information about presence/absence at an assigned visit destination. In step S1704, the control unit 410 confirms a visit status in an assigned visit destination. For example, the control unit 410 generates a predetermined request signal and transmits the signal to the third information processing terminal 30 via the communication unit 430, and acquires information about a visit status in the assigned visit destination from the third information processing terminal 30.

If no visit to the assigned visit destination has been made yet (step S1708/Yes), the visit route determination unit 412 uses the changed prediction information about presence/absence to perform the process of determining a visit route of FIG. 17 again, in step S1712. Note that, as illustrated in step S1628 of FIG. 17, if the visit route determination unit 412 determines that an assigned visit destination needs to be changed to determine an appropriate visit route, the process of determining a visit destination to be assigned, illustrated in FIG. 16, is performed again in step S1632 of FIG. 17.

If an assigned visit destination or the visit route is changed (step S1716/Yes) in step S1720, the communication unit 430 transmits changed information about an assigned visit destination and visit route to the third information processing terminal 30, and a series of process steps ends. If a visit to an assigned visit destination having the changed prediction information about presence/absence has already been made, in step S1708 (step S1708/No), and if the assigned visit destinations or the visit route is not changed in step S1716 (step S1716/No), the process ends without notification to the third information processing terminal 30.

(Process of Displaying Assigned Visit Destinations, Visit Route, Prediction Information About Presence/absence, or Like)

Figure 19:
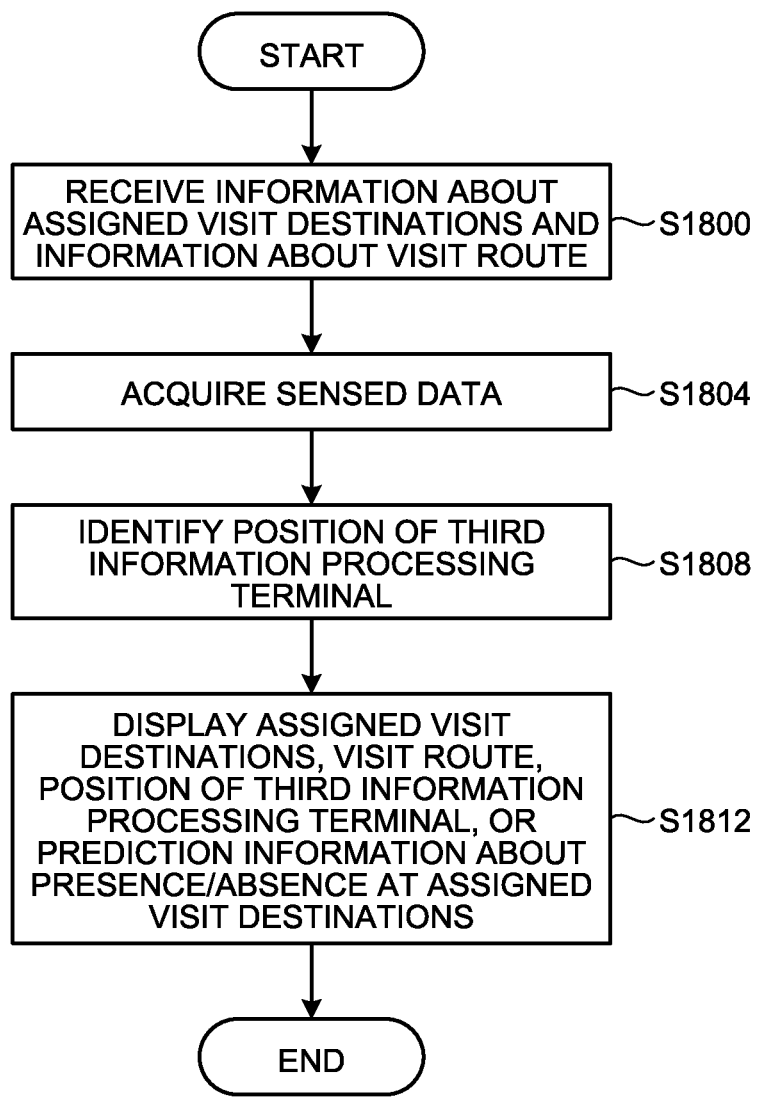
FIG. 19 is a flowchart illustrating an example of a procedure of a process of displaying various pieces of information, the process being performed by the third information processing terminal 30.

Next, an example of a procedure of a process of displaying various pieces of information by the third information processing terminal 30 will be described with reference to FIG. 19.

In step S1800, the communication unit 340 of the third information processing terminal 30 receives information about assigned visit destinations and a visit route from the information processing server 40. In step S1804, the control unit 330 acquires sensed data from the sensor unit 320. In particular, the control unit 330 acquires sensed data from the position sensor (e.g., a GNSS sensor or the like). In step S1808, the control unit 330 identifies the position of the third information processing terminal 30 by analyzing the sensed data. In step S1812, the display unit 310 displays map information and displays the assigned visit destinations, the visit route, the position of the third information processing terminal 30, or the prediction information about presence/absence at the assigned visit destinations (e.g., a time period of the "presence state", a time period of the "absence state", or the like) on the map information, in a superimposed manner.

<<1.9. Example of Display by Third Information Processing Terminal 30>>

In the above, the procedures of the processes performed by the devices have been described. Then, an example of display by the third information processing terminal 30 will be described with reference to FIGS. 20 and 21.

As described above, the third information processing terminal 30 is configured to display assigned visit destinations, a visit route, the position of the third information processing terminal 30, and prediction information about presence/absence at an assigned visit destination, on map information in a superimposed manner.

Figure 20:
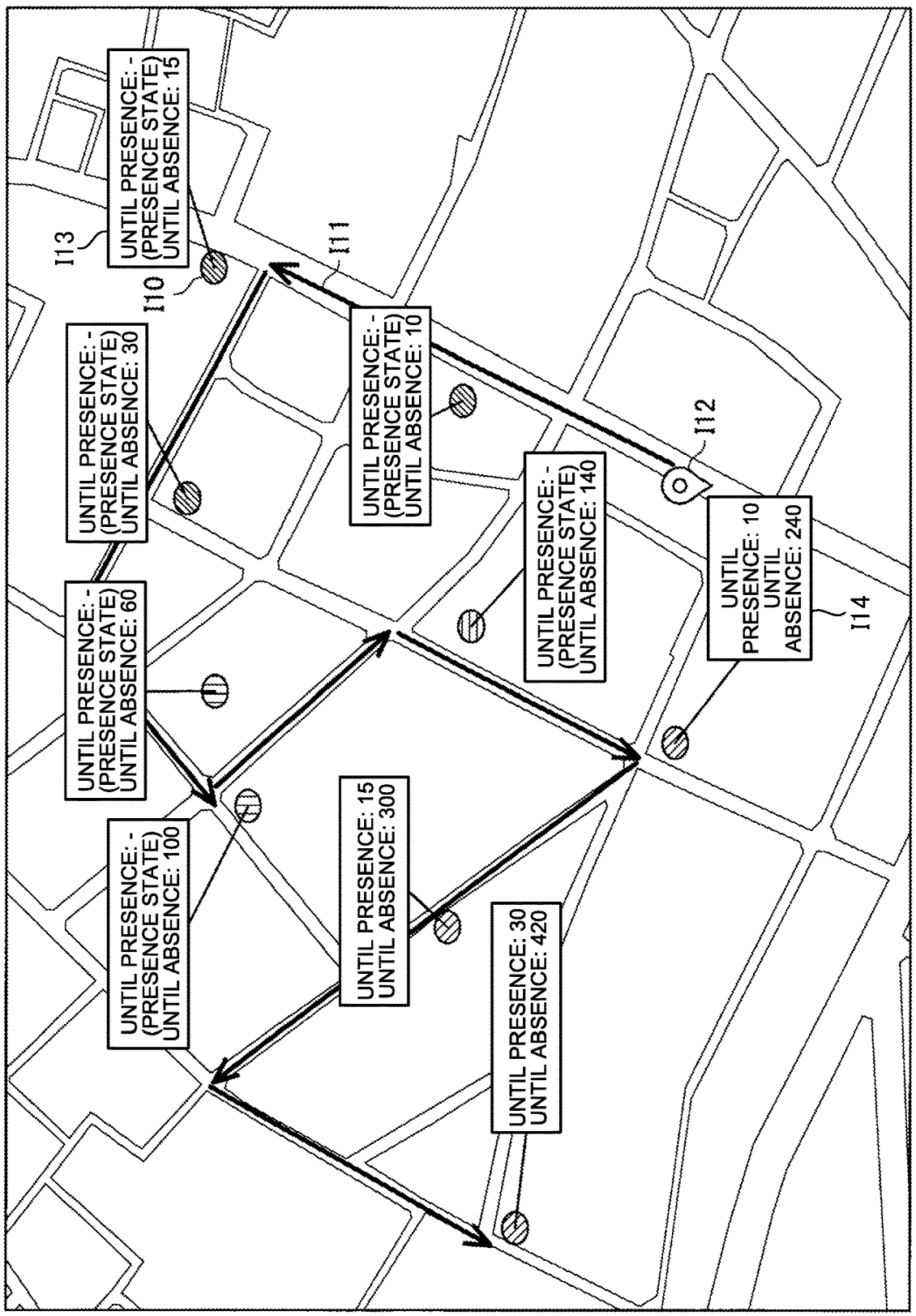
FIG. 20 is a diagram illustrating an example of display by the third information processing terminal 30.

For example, as illustrated in FIG. 20, the third information processing terminal 30 may display an image I10 indicating an assigned visit destination, an image I11 indicating a visit route, an image I12 indicating the position of the third information processing terminal 30, and an image I13 and an image I14 that indicate prediction information about presence/absence at an assigned visit destination, on the map information in a superimposed manner.

Here, the image I10 indicating an assigned visit destination may be displayed in conjunction with the prediction information about presence/absence at an assigned visit destination. For example, the hue of the image I10 may be changed according to the remaining time until the end time of the presence state (e.g., change in color of the image I10 from purple to blue, green, yellow, orange, and red in this order, as the remaining time decreases) This makes it possible for a visitor to intuitively understand an assigned visit destination to be visited preferentially.

Furthermore, by displaying the image I11 indicating a visit route, the visitor can intuitively recognize the visit order. Furthermore, by displaying the image I12 indicating the position of the third information processing terminal 30, the visitor can recognize the positional relationship between the current location and a visit destination.

Furthermore, by displaying the image I13 and the image I14 indicating the prediction information about presence/absence at an assigned visit destination, the visitor can recognize a time period in which the assigned visit destination is in the presence state and a time period in which the assigned visit destination is in the absence state. Here, the image I13 shows an example in which the assigned visit destination is in the presence state at the time of display and the remaining time until the end time of the presence state (i.e., the start time of the absence state) is 15 minutes. Furthermore, the image I14 shows an example in which the assigned visit destination is in the absence state at the time of display, the remaining time until the start time of the presence state is 10 minutes, and the remaining time until the end time of the presence state is 240 minutes.

Figure 21:
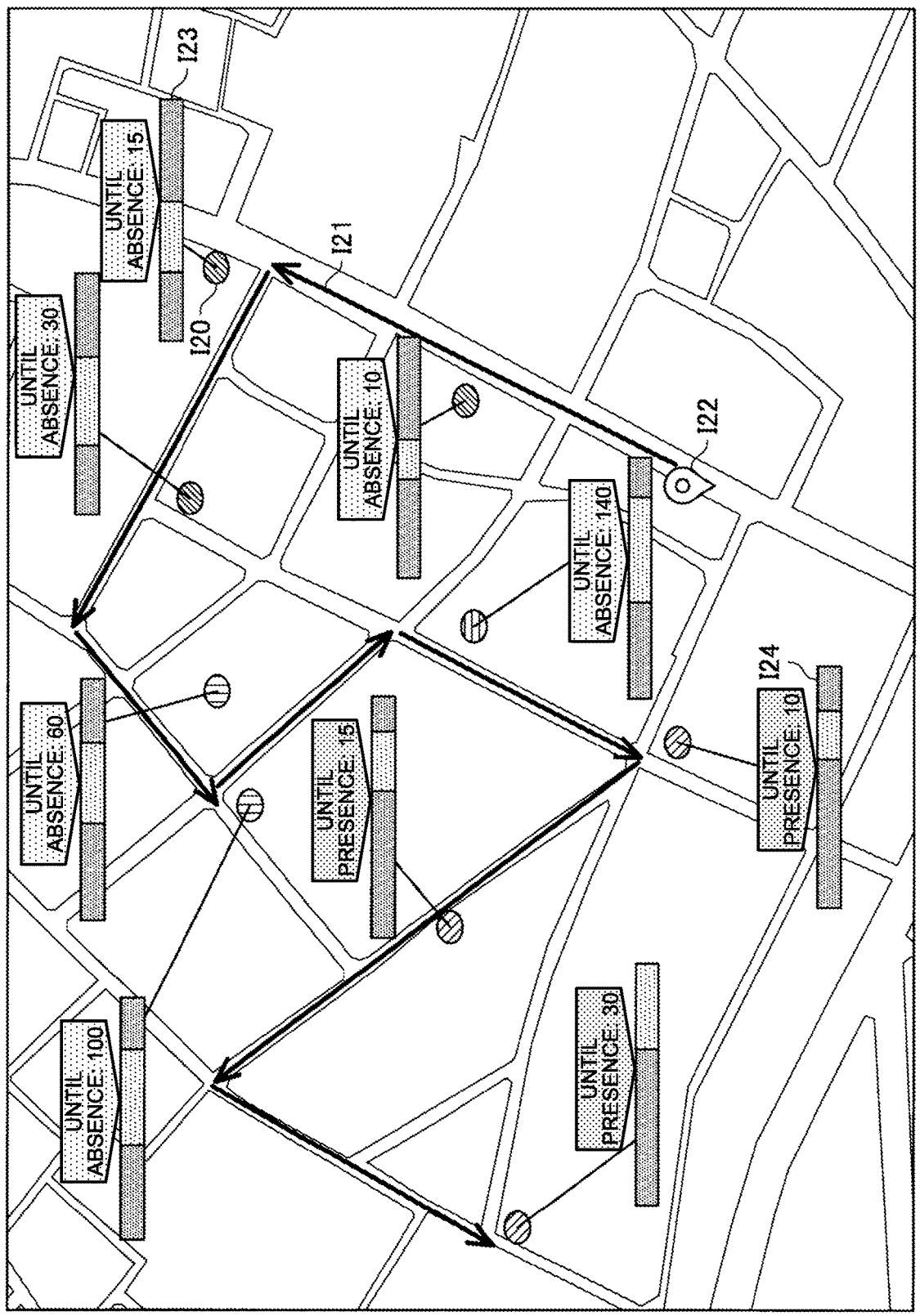
FIG. 21 is a diagram illustrating an example of display by the third information processing terminal 30.

Furthermore, a display as illustrated in FIG. 21 may be performed. In FIG. 21, an image I20 indicating an assigned visit destination, an image I21 indicating a visit route, an image I22 indicating the position of the third information processing terminal 30, and an image I23 and an image I24 that indicate prediction information about presence/absence at an assigned visit destination are displayed.

A difference between FIG. 21 and FIG. 20 will be described. The image I23 and the image I24 in FIG. 21 are different from the image I13 and the image I14 in FIG. 20 in that a time period of the presence state and a time period of the absence state are represented by bars of different hues. Furthermore, the image I23 and the image I24 in FIG. 21 indicate the time of display with an arrow, and the remaining time until the end time of the presence state or the remaining time until the start time of the presence state is indicated in the arrow. More specifically, the image I23 shows an example in which the assigned visit destination is in the presence state at the time of display and the remaining time until the end time of the presence state is 15 minutes. In addition, the image I24 shows an example in which the assigned visit destination is in the absence state at the time of display, and the remaining time until the start time of the presence state is 10 minutes.

The example of display by the third information processing terminal 30 has been described above. Note that display described above with reference to FIGS. 20 and 21 is merely an example, and display by the third information processing terminal 30 is not limited to such example. For example, display by the third information processing terminal 30 may not necessarily include all the images illustrated in FIGS. 20 and 21. Furthermore, display by the third information processing terminal 30 is flexibly changeable according to the specification or operation thereof.

<<1.10. Various Services to which Present Disclosure is Applied>>

The example of display by the third information processing terminal 30 has been described above. Next, service variations to which the present disclosure is applied will be described.

In the above embodiments, the visit service to which the present disclosure is applied has been described. Here, the visit service is not particularly limited as long as the visit service is a service that requires a visitor to visit an appropriate place for an appropriate purpose. For example, the visit service includes a construction service, repair service, home childcare service, rehabilitation service (e.g. home rehabilitation service or outpatient rehabilitation service, etc.), sitter service (e.g. babysitter service, elderly care service, pet sitter, etc.), tutor service, housekeeping service, delivery service (e.g., home delivery service etc.), door-to-door sales service (including any other business), or the like at a visit destination.

In addition, the information processing system according to the present disclosure is configured to link with an information processing system managing users who desire to provide the various visit services as described above. For example, it is assumed that there is an information processing system that manages the attributes of a user who desires to provide a visit service (e.g., name, age, gender, etc.), areas that the user can visit, a time period in which the user can make a visit or conditions for visit, and the like. The information processing system according to the present disclosure may provide a function for matching a visiting user with a visited user by linking with the information processing system. For example, the information processing server 40 may achieve matching by extracting, as the visited user, a user who is setting the "presence state" in a time period in which the visiting user can make a visit in an area that the visiting user can visit.

Note that the information processing server 40 may manage a common platform applicable to a plurality of visit services. Then, by using the common platform, the information processing server 40 may provide a function for managing the prediction information about presence/absence at a visit destination, a function for determining a visit destination to be assigned, and a function of determining a visit route, to a plurality of visit services. Thus, the cost of constructing a dedicated system for each of a plurality of visit services can be reduced.

2. Exemplary Hardware Configuration

The embodiments of the present disclosure have been described above. Next, an exemplary hardware configuration will be described with reference to FIG. 22, where the hardware configuration is common to the first information processing terminal 10, the second information processing terminal 20, the third information processing terminal 30, and the information processing server 40 according to an embodiment of the present disclosure.

Figure 22:
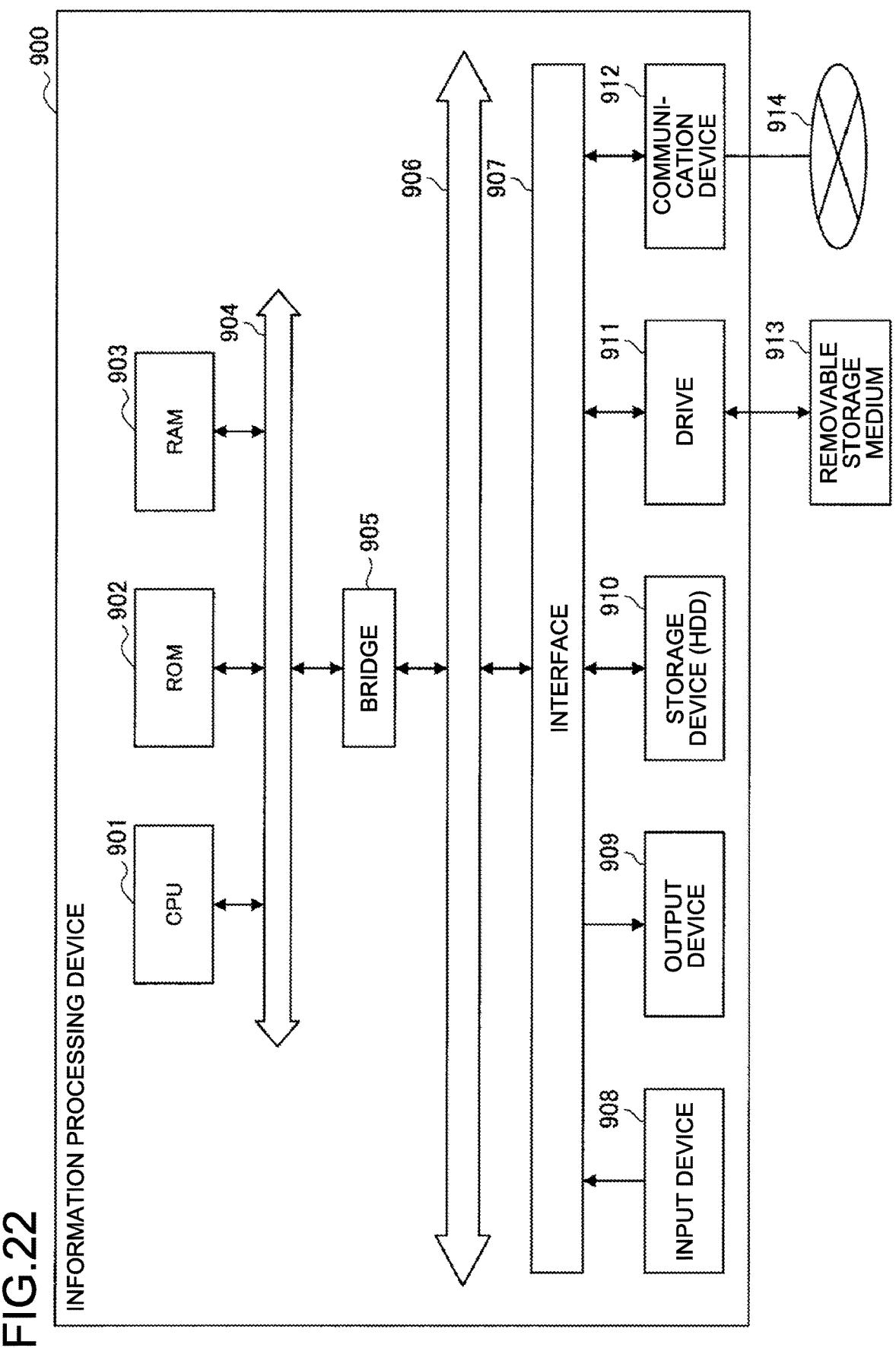
FIG. 22 is a block diagram illustrating an exemplary hardware configuration of an information processing device 900 for achieving the first information processing terminal 10, the second information processing terminal 20, the third information processing terminal 30, and the information processing server 40.

FIG. 22 is a diagram illustrating a hardware configuration of an information processing device 900 that achieves the first information processing terminal 10, the second information processing terminal 20, the third information processing terminal 30, and the information processing server 40. The information processing device 900 includes a central processing unit (CPU) 901, a read only memory (ROM) 902, a random access memory (RAM) 903, a host bus 904, a bridge 905, an external bus 906, an interface 907, an input device 908, an output device 909, a storage device (HDD) 910, a drive 911, and a communication device 912.

The CPU 901 functions as an arithmetic processing device and a control device and controls the overall operation in the information processing device 900 according to various programs. Furthermore, the CPU 901 may be a microprocessor. The ROM 902 stores programs, calculation parameters, and the like used by the CPU 901. The RAM 903 temporarily stores programs used in execution of the CPU 901, parameters appropriately changing during execution of the CPU 901, and the like. The CPU 901, the ROM 902, and the RAM 903 are connected to each other via the host bus 904 including a CPU bus. Cooperation of the CPU 901, ROM 902, and RAM 903 achieves the functions of the control unit 160, the imaging unit 140, and the sensor unit 150 of the first information processing terminal 10, the control unit 250 and the sensor unit 240 of the second information processing terminal 20, the control unit 330 and the sensor unit 320 of the third information processing terminal 30, and the control unit 410 of the information processing server 40.

The host bus 904 is connected to the external bus 906, such as a peripheral component interconnect/interface (PCI) bus, via the bridge 905. Note that the host bus 904, the bridge 905, and the external bus 906 are not necessarily configured separately from each other, and these functions may be implemented on one bus.

The input device 908 includes input means, an input control circuit, and the like. The input means, such as a mouse, keyboard, touch panel, button, microphone, switch, or lever, is used for a user to input information, and the input control circuit generates an input signal on the basis of an input by the user and outputs the input signal to the CPU 901. The user of the information processing device 900 can input various pieces of data and instruct a processing operation to each device by operating the input device 908. The input device 908 achieves the functions of the voice input unit 130 of the first information processing terminal 10 and the voice input unit 230 of the second information processing terminal 20.

The output device 909 includes a display device, such as a cathode ray tube (CRT) display device, a liquid crystal display (LCD) device, an organic light emitting diode (OLED) device, or a lamp. Furthermore, the output device 909 includes a voice output device such as a speaker and headphones. The output device 909 outputs, for example, reproduced content. Specifically, the display device displays various pieces of information, such as reproduced video data, as a text or image. On the other hand, the voice output device converts reproduced voice data or the like into voice and outputs the voice. The output device 909 achieves the functions of the display unit 110 and the voice output unit 120 of the first information processing terminal 10, the display unit 210 and the voice output unit 220 of the second information processing terminal 20, and the display unit 310 of the third information processing terminal 30.

The storage device 910 is a device for storing data. The storage device 910 may include a storage medium, a recording device that records data on the storage medium, a reading device that reads data from the storage medium, a deletion device that deletes data recorded on the storage medium, and the like. The storage device 910 includes, for example, a hard disk drive (HDD). The storage device 910 drives a hard disk and stores programs executed by the CPU 901 and various pieces of data. The storage device 910 achieves the functions of the storage unit 180 of the first information processing terminal 10 and the storage unit 420 of the information processing server 40.

The drive 911 is a reader/writer for a storage medium and is built in or externally connected to the information processing device 900. The drive 911 reads information recorded on a mounted magnetic disk, optical disk, magneto-optical disk, or a removable storage medium 913 such as a semiconductor memory and outputs the information to the RAM 903. The drive 911 is also configured to write information to the removable storage medium 913.

The communication device 912 is a communication interface including, for example, a communication device that connects to the communication network 914. The communication device 912 achieves the functions of the communication unit 170 of the first information processing terminal 10, the communication unit 260 of the second information processing terminal 20, the communication unit 340 of the third information processing terminal 30, and the communication unit 430 of the information processing server 40.

3. Summary

As described above, the first information processing terminal 10 is configured to predict the presence/absence of a user at a visit destination, using sensed data. Furthermore, the first information processing terminal 10 is configured to set a definition of the presence/absence of the user on the basis of an input from the user.

The information processing server 40 is configured to acquire prediction information about the presence/absence of a user at each visit destination from the first information processing terminal 10 and determine a visit destination to be assigned for each visitor from a plurality of visit destinations on the basis of the information. Furthermore, the information processing server 40 is configured to determine a visit route on the basis of information about assigned visit destinations for each visitor and prediction information about presence/absence, the visit route enabling visits to all assigned visit destinations in a time period in which a user at each assigned visit destination can cope with a visit.

Then, the third information processing terminal 30 is configured to cause the assigned visit destinations, the visit route, the position of the third information processing terminal 30, time periods of "presence states" and time periods of "absence states" at the assigned visit destinations to be displayed on the map information in a superimposed manner.

The preferred embodiments of the present disclosure have been described in detail above with reference to the accompanying drawings, but the technical scope of the present disclosure is not limited to such examples. A person skilled in the art may obviously find various alternations and modifications within the technical ideas as set forth in the scope of the appended claims, and it should be understood that they will naturally come under the technical scope of the present invention.

For example, the present disclosure may be configured so that the user can freely specify a visit destination. In the above description, the visit destination for which a facility such as a house or company, a package delivery locker, or the like is specified has been described, but an object specified as the visit destination is not limited thereto.

For example, any point on the map (e.g., a road, intersection, bridge, overpass, etc.) may be specified as the visit destination. That is, the user can specify a visit destination more flexibly. Note that the present disclosure may be configured so that a visitor can also freely specify a visit destination. In a case where a visit destination is specified by the user, the first information processing terminal 10 may include a visit destination specification unit that specifies a visit destination on the basis of an input from the user, or, for example, the presence/absence definition unit 162 may specify a visit destination on the basis of a user's input. Moreover, an installation place of the package delivery locker described above is not particularly limited. For example, a package delivery locker installed in an apartment house, a convenience store, a station, or the like may be used.

Furthermore, the effects descried herein are merely explanatory or exemplary effects, and not limitative. In other words, the technology according to the present disclosure can achieve other effects that are apparent to those skilled in the art from the description herein, along with or instead of the above effects.

Additionally, the present technology may also be configured as below:

(1)
An information processing device comprising:
a presence/absence prediction unit that performs prediction of presence/absence of a user at a visit destination on a basis of sensed data; and
a providing unit that provides a result of the prediction to an external device.

(2)
The information processing device according to (1), wherein
the presence/absence prediction unit predicts whether the user is in any of a presence state or an absence state, wherein the presence state is a state in which the user can cope with a visit or desires a visit, and the absence state is a state in which the user cannot cope with a visit or does not desire a visit.

(3)
The information processing device according to (2), wherein
the presence/absence prediction unit predicts presence/absence of a plurality of users at the visit destination to predict whether the visit destination is in any of the presence state or the absence state.

(4)
The information processing device according to (3), wherein
the presence/absence prediction unit predicts that the visit destination is in the presence state when any one of the plurality of users is predicted to be in the presence state.

(5)
The information processing device according to (3), wherein
the presence/absence prediction unit predicts that the visit destination is in the presence state when a user who is specified from the plurality of users in advance is predicted to be in the presence state.

(6)
The information processing device according to any one of (2) to (5), further comprising
a presence/absence definition unit that sets a definition of the presence state or the absence state on a basis of a user's input.

(7)
The information processing device according to (6), wherein
the presence/absence definition unit sets the definition on a basis of an action or a state of the user or a time period.

(8)
The information processing device according to (6) or (7), wherein
the presence/absence definition unit also sets a user who is not a target of the prediction, on a basis of a user's input.

(9)
The information processing device according to any one of (1) to (8), wherein
the sensed data includes data output from a sensor arranged on premises of the visit destination.

(10)
The information processing device according to any one of (1) to (9), wherein
the sensed data includes data output from a sensor carried by the user or a sensor mounted on the user.

(11)
The information processing device according to any one of (1) to (10), wherein the presence/absence prediction unit performs the prediction on a basis of a past action history of the user.

(12)

The information processing device according to any one of (1) to (11), further comprising
a visit destination specification unit that specifies the visit destination on a basis of a user's input.

(13)

The information processing device according to any one of (1) to (12), wherein
the information processing device is an agent device that makes voice conversation.

(14)

An information processing device comprising:
an acquisition unit that acquires prediction information about presence/absence of users at a plurality of visit destinations from an external device; and
a visit-destination-to-be-assigned determination unit that determines visit destinations to be assigned to a visitor, on a basis of the prediction information.

(15)

The information processing device according to (14), further comprising
a visit route determination unit that determines a route that enables a visit to the visit destinations assigned to a visitor, on a basis of the prediction information.

(16)

An information processing device comprising:
an acquisition unit that acquires, from an external device, information about visit destinations assigned to a visitor, the information being determined on a basis of prediction information about presence/absence of users at a plurality of visit destinations; and
a display unit that displays the information about visit destinations assigned to a visitor.

(17)

The information processing device according to (16), wherein
the acquisition unit also acquires, from the external device, information about a route that enables a visit to the visit destinations assigned to a visitor, the information being determined on a basis of the prediction information, and
the display unit also displays the information about a route.

(18)

An information processing method comprising the steps of:
predicting presence/absence of a user at a visit destination, on a basis of sensed data; and
providing a result of the prediction to an external device, wherein the steps are executed by a processor.

(19)

An information processing method comprising the steps of:
obtaining prediction information about presence/absence of users at a plurality of visit destinations from an external device; and
determining visit destinations to be assigned to a visitor, on a basis of the prediction information,
wherein the steps are executed by a processor.

(20)

An information processing method comprising the steps of:
acquiring, from an external device, information about visit destinations assigned to a visitor, the information being determined on a basis of prediction information about presence/absence of users at a plurality of visit destinations; and
displaying the information about visit destinations assigned to a visitor,
wherein the steps are executed by a processor.

REFERENCE SIGNS LIST

10 FIRST INFORMATION PROCESSING TERMINAL
110 DISPLAY UNIT
120 VOICE OUTPUT UNIT
130 VOICE INPUT UNIT
140 IMAGING UNIT
150 SENSOR UNIT
160 CONTROL UNIT
161 PRESENCE/ABSENCE PREDICTION UNIT
162 PRESENCE/ABSENCE DEFINITION UNIT
170 COMMUNICATION UNIT
180 STORAGE UNIT
181 USER DB
182 PRESENCE/ABSENCE DEFINITION DB
183 ACTION HISTORY DB
184 LIFESTYLE DB
20 SECOND INFORMATION PROCESSING TERMINAL
210 DISPLAY UNIT
220 VOICE OUTPUT UNIT
230 VOICE INPUT UNIT
240 SENSOR UNIT
250 CONTROL UNIT
260 COMMUNICATION UNIT
30 THIRD INFORMATION PROCESSING TERMINAL
310 DISPLAY UNIT
320 SENSOR UNIT
330 CONTROL UNIT
340 COMMUNICATION UNIT
40 INFORMATION PROCESSING SERVER
410 CONTROL UNIT
411 VISIT-DESTINATION-TO-BE-ASSIGNED DETERMINATION UNIT
412 VISIT ROUTE DETERMINATION UNIT
420 STORAGE UNIT
430 COMMUNICATION UNIT

The invention claimed is:
1. An information processing device, comprising:
a presence/absence prediction unit configured to:
acquire sensed data associated with a first user;
acquire action history data of the first user that includes a plurality of past actions of the first user;
determine a plurality of sensed data-action relevance scores based on the sensed data and the action history data, wherein each sensed data-action relevance score of the plurality of sensed data-action relevance scores indicates a relevance between the sensed data and a corresponding action of the plurality of past actions;
estimate an action of the first user from the plurality of past actions, based on the plurality of sensed data-action relevance scores;
acquire lifestyle data associated with the first user;
determine a score indicating a relevance between the lifestyle data and the estimated action;
predict a future action of the first user based on the determined score indicating the relevance between the lifestyle data and the estimated action; and predict one of a presence of the first user or an absence of the first user at a visit destination, based on the predicted future action;

a presence/absence definition unit configured to set, based on an age of a second user that is less than a determined age, the second user as a non-target user for prediction of one of a presence of the second user or an absence of the second user at the visit destination; and a providing unit configured to output, to an external device, a result of the prediction of the one of the presence or the absence of the first user at the visit destination.

2. The information processing device according to claim 1, wherein
the presence/absence prediction unit is further configured to predict the first user is in one of a first presence state or a first absence state,
in the first presence state, the first user can cope with a visit or desires the visit, and
in the first absence state, the first user cannot cope with the visit or does not desire the visit.

3. The information processing device according to claim 2, wherein
the presence/absence prediction unit is further configured to:
predict one of a presence of a plurality of users or an absence of the plurality of users at the visit destination; and
predict, based on the predicted one of the presence of the plurality of users or the absence of the plurality of users, one of the visit destination is in a second presence state or the visit destination is in a second absence state, and
the plurality of users includes the first user.

4. The information processing device according to claim 3, wherein the presence/absence prediction unit is further configured to predict the visit destination is in the second presence state in a case where one of the plurality of users is predicted to be in the first presence state.

5. The information processing device according to claim 3, wherein the presence/absence prediction unit is further configured to predict the visit destination is in the second presence state in a case where a target user of the plurality of users is predicted to be in the first presence state.

6. The information processing device according to claim 2, wherein the presence/absence definition unit is further configured to set a definition of at least one of the first presence state or the first absence state based on a first user input.

7. The information processing device according to claim 6, wherein the presence/absence definition unit is further configured to set the definition based on one of
the action of the first user,
a state of the first user, or
a time period of one of the first presence state or the first absence state.

8. The information processing device according to claim 6, wherein the presence/absence definition unit is further configured to set, based on a second user input, the second user different from the first user as the non-target user for the prediction of the one of the presence of the second user or the absence of the second user at the visit destination.

9. The information processing device according to claim 1, wherein the sensed data includes data output from a sensor arranged on premises of the visit destination.

10. The information processing device according to claim 1, wherein the sensed data includes data output from a sensor carried by the first user or a sensor mounted on the first user.

11. The information processing device according to claim 1, further comprising a visit destination specification unit configured to specify the visit destination based on a user input.

12. The information processing device according to claim 1, wherein the information processing device is an agent device configured to execute voice conversation with the first user.

13. The information processing device according to claim 1, wherein the lifestyle data associated with the first user is based on the plurality of past actions of the first user.

14. An information processing method executed by a processor, comprising:
acquiring sensed data associated with a first user;
acquiring action history data of the first user that includes a plurality of past actions of the first user;
determining a plurality of sensed data-action relevance scores based on the sensed data and the action history data, wherein each sensed data-action relevance score of the plurality of sensed data-action relevance scores indicates a relevance between the sensed data and a corresponding action of the plurality of past actions;
estimating an action of the first user from the plurality of past actions, based on the plurality of sensed data-action relevance scores;
acquiring lifestyle data associated with the first user;
determining a score indicating a relevance between the lifestyle data and the estimated action;
predicting a future action of the first user based on the determined score indicating the relevance between the lifestyle data and the estimated action;
predicting one of a presence of the first user or an absence of the first user at a visit destination, based on the predicted future action;
setting, based on an age of a second user that is less than a determined age, the second user as a non-target user for prediction of one of a presence of the second user or an absence of the second user at the visit destination; and
outputting, to an external device, a result of the prediction of the one of the presence or the absence of the first user at the visit destination.

* * * * *